US009442548B1

(12) United States Patent
Johansson et al.

(10) Patent No.: US 9,442,548 B1
(45) Date of Patent: Sep. 13, 2016

(54) DEVICE CHARGING SYSTEM

(71) Applicant: AMAZON TECHNOLOGIES, INC., Reno, NV (US)

(72) Inventors: Jesper Mikael Johansson, Redmond, WA (US); George Nikolaos Stathakopoulos, Seattle, WA (US); Aaron James Dykstra, Federal Way, WA (US)

(73) Assignee: Amazon Technologies, Inc., Reno, NV (US)

( * ) Notice: Subject to any disclaimer, the term of this patent is extended or adjusted under 35 U.S.C. 154(b) by 176 days.

(21) Appl. No.: 14/218,938

(22) Filed: Mar. 18, 2014

(51) Int. Cl.
| G06F 1/26 | (2006.01) |
| G06F 1/28 | (2006.01) |
| H02J 7/00 | (2006.01) |
| G06F 1/32 | (2006.01) |
| G06F 1/16 | (2006.01) |
| H02J 7/04 | (2006.01) |

(52) U.S. Cl.
CPC ............... *G06F 1/28* (2013.01); *G06F 1/1616* (2013.01); *G06F 1/26* (2013.01); *G06F 1/3212* (2013.01); *H02J 7/0054* (2013.01); *H02J 7/0073* (2013.01); *H02J 7/041* (2013.01)

(58) Field of Classification Search
CPC .......... G06F 1/26; G06F 1/28; G06F 1/3212; H02J 7/0021; H02J 7/0054; H02J 2007/0049; H02J 2007/005
USPC ........................................ 713/300, 330, 340
See application file for complete search history.

(56) References Cited

U.S. PATENT DOCUMENTS

| 2006/0121951 A1* | 6/2006 | Perdomo ........... H04M 1/72513 455/572 |
| 2007/0096691 A1* | 5/2007 | Duncan .................... G06F 1/263 320/114 |
| 2012/0123995 A1 | 5/2012 | Boot |
| 2012/0319492 A1 | 12/2012 | Saito |
| 2013/0311803 A1* | 1/2013 | Abendroth ............ G06F 1/3212 713/320 |
| 2013/0311794 A1 | 11/2013 | Stewart |
| 2014/0067140 A1 | 3/2014 | Gow |
| 2014/0163754 A1 | 6/2014 | Potter et al. |
| 2014/0172561 A1* | 6/2014 | Moon ................. G06Q 30/0255 705/14.53 |
| 2015/0077063 A1 | 3/2015 | Tsukamoto |

OTHER PUBLICATIONS

Dinh, Paul, Non-final Office Action dated Apr. 28, 2016, U.S. Appl. No. 14/218,943, The United States Patent and Trademark Office, Apr. 28, 2016.

* cited by examiner

*Primary Examiner* — Michael J Brown
(74) *Attorney, Agent, or Firm* — Lindauer Law, PLLC

(57) ABSTRACT

A computing device monitors the energy level of a rechargeable battery, from which the device draws operating power. Historic usage data is used to estimate the time remaining in a present operating period, such as a workday, as well as to estimate the battery level required to provide power during that period of time. A user is then presented with information regarding the status of the battery, as well as charging time and required battery level estimates. Information regarding charging stations within publically or otherwise user-accessible venues near to the present location of the computing device is accessed and presented to the user. Reservations may be made for a charging port within a selected venue, an order may be placed for goods or services available at that venue, or other actions may be performed.

20 Claims, 12 Drawing Sheets

DEVICE CHARGING SYSTEM

BACKGROUND

Portable computing devices often operate by way of rechargeable batteries. Loss of operating time resulting from the need to recharge such batteries is a concern for numerous users.

Figure 1:
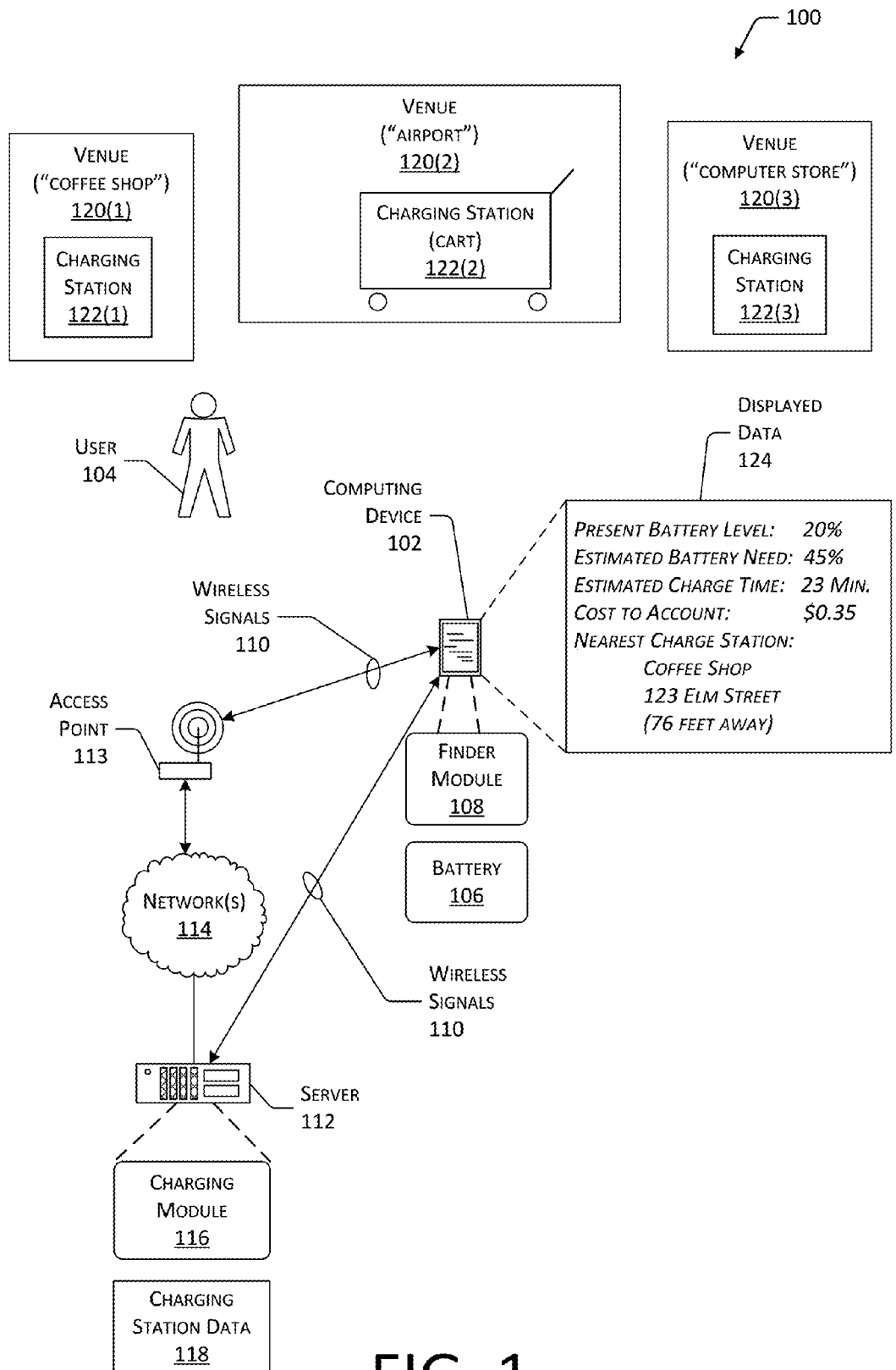
FIG. 1 depicts views including a computing device and a server, venues that provide charging stations, and information regarding battery levels and times for recharging that battery.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

People use a wide variety of portable computing devices for a vast number of purposes. Tablet computers, smart phones, electronic book or "e-book" readers, media devices, wearable computers, laptop computers, and so forth, are a few non-limiting examples. Often, such a computing device is operated for some number of hours as part of a daily routine, and then connected so as to recharge a battery or batteries at night or during another inactive period.

Sometimes, a user operates a computing device for longer than a normal period of time, or such operations are intensified due to additional computational tasks, an increased volume of electronic communications, or other activities. The result may be insufficient power remaining in the rechargeable battery or batteries to get through the present workday or other situation, without taking time to recharge. This problem may be remedied if the required charging equipment and a source of electrical energy are at hand. However, a user may wind up with insufficient battery power while away from their home or office and the needed charging facilities. Such a circumstance may occur in a public place like a downtown area, airport or other transportation hub, while aboard an aircraft or mass transit vehicle, and so on.

Charging station access, as well as related items or services, are being increasingly offered in public or other venues owing to the popularity of such portable computing devices. Coffee shops, airports, transit terminals, public libraries, and the like, often offer the use of charging ports, cable assemblies, or other accessories, as well as access to electrical energy so as to charge a computing device. Numerous such venues may be located within relatively close proximity to each other, such that a user in need of charging a computing device may have more than one option to select from. Nonetheless, if a user has no knowledge of which nearby venues offer such charging facilities, and which do not, considerable time may be wasted searching in vain—time that the user may not have to spare under the present circumstances.

In one example, a user of a tablet computer is visiting an unfamiliar city during business travel. The user has four hours remaining in their workday, but the rechargeable battery within their tablet computer is at 15% of capacity—approximately enough energy for just over one hour of normal operation. An application running in the background on their tablet computer uses historical usage data to determine that about three more hours of battery life are likely to be required, in addition to the one hour that is presently in the battery. The application then accesses a predetermined network resource by way of wireless signals, requesting information regarding accessible charging stations within a convenient distance—such as five hundred feet—of the present location.

The tablet computer receives a response to the request, which includes information regarding three different venues that offer charging stations accessible to the user or to the general public. The information includes venue names, addresses or locating directions, and describes other goods or services offered by each. This information, along with data regarding the present status and an estimated charging time for the rechargeable battery, are presented to the user by way of a display or other output device. The application further determines a distance to each of the three venues, and presents that information as well. The user is now aware that they will likely lose productive operating time if the battery is not charged, at least to a projected level of 60%. The user then selects one of the three venues, which is about one hundred feet away, using the presented address information. A mapping or navigational aid application, or other resources, may also be employed. The user then locates the charging station within the selected venue and begins charging the rechargeable battery, with no appreciable time wasted searching for such a location.

In another example, a user is awaiting a connecting flight in an airport terminal, while reading a novel on an "e-book" reader. A data file for a calendar application on the e-book reader indicates that their flight is scheduled to depart in one hour, and is slated to be two hours long. However, an application running in the background senses that the rechargeable battery in the e-book reader is presently at an 8% level, with a depleted state expected in approximately forty minutes under present use. The application further estimates twenty minutes of charging time, beginning now, will charge the battery to a sufficient level to allow the user to read from their novel during the scheduled flight.

The application then presents a message on the display of the e-book reader, indicating the present state of the battery and recommending twenty minutes of charging time to provide sufficient, estimated power for use during the flight. The application further queries the user if they would like information regarding charging stations located within the airport. The user provides input to the e-book indicating that such information is desirable. The application then accesses a publicly accessible server of the airport by way of wireless signaling, seeking information regarding charging stations.

The server determines from stored data that two charging stations are present within two hundred feet of the wireless access point used by the requesting e-book reader. The server then sends information regarding these two charging stations to the e-book reader, which may include nearby gate numbers, names of the venues hosting the respective charging stations, and so forth. Other information may also be included. This information is presented on the e-book display, and the user notes that the nearest one of two charging stations is an attendant-based venue located just two gates away. The information further indicates that the nearer venue charges one dollar for twenty minutes of charging services, which may be applied to the user's credit card or online debit account. The user then proceeds toward the nearer of the two venues.

After arriving at the charging station, the user is greeted by the attendant who takes possession of the e-book reader in exchange for an electronic paging device. The user then authorizes the charging fee and uses their credit card to pay the charges. The user then departs for a nearby coffee vendor while the attendant connects the e-book reader to a charging port and begins the twenty minute charging process. While connected to the charging port, a server device downloads promotional information about items and services available from the commercial entity operating the charging station venue. Once the charging process is complete, the user is alerted by the paging device to return to the charging station venue. The paging device is then exchanged for their e-book reader, which is now sufficiently charged for use during the impending flight. Respective variations on the foregoing may also be used in accordance with the methods, devices, and systems described herein.

FIG. 1 depicts views 100 including particular elements and operations performed by each. The views 100 are illustrative and non-limiting in nature, and other elements, devices, systems, or respective operations are also contemplated.

A computing device 102 is depicted as a tablet computer. Numerous other types of computing devices 102, such as "smart phones", wearable computers, laptop computers, media devices, e-book readers, and so on, may also be used. The computing device 102 is associated with a user 104. The computing device 102 is configured for portable operation and is powered by a rechargeable battery 106, which is supported by the computing device 102.

In another instance, the computing device 102 is powered by one or more fuel cells, super capacitors, or another suitable type of energy storage device. Such energy storage devices are thus "rechargeable" by way of electrical energy, chemical energy or chemical refill, hydrogen-based fuel, one or more fuel cell reactants, mechanical energy stored by way of a wind-up spring, flywheel, or another consumable resource that may be replenished by way of a suitable charging station.

The computing device 102 also includes a finder module 108. The finder module 108 may include electronic circuitry, a controller, non-volatile storage media, executable program code, or any other suitable constituency. The finder module 108 is configured to perform various operations and functions as described herein. The finder module 108 is further configured to access other resources of the computing device 102 such as wireless communications resources, rechargeable battery 106 management circuitry, a display or other output device, cellular communications circuitry, and so forth. The computing device 102 is also configured to send and receive data, signals, or other information by way of wireless signals 110. Such wireless signals 110 may include, without limitation, those in accordance with Institute of Electrical and Electronics (IEEE) standard 802.11, such as Bluetooth®, Wi-Fi®, or other protocols. Other suitable wireless signaling formats, protocols, or standards may also be used.

A server 112 may be configured to communicate with the computing device 102 using an access point (AP) 113, by way of one or more networks 114, using the wireless signals 110, and so forth. For example, the computing device 102 may connect to the access point 113 which is connected to the network 114, which in turn connects to the server 112. In another example, the server 112 may include the AP 113 or equivalent components and may provide wireless connectivity to the computing device 102. The network(s) 114 may include a local-area network (LAN), a wide-area network (WAN), the Internet or access thereto, and so forth. In one instance, the server 112 may be owned or operated by an entity, such as a commercial enterprise, which offers goods or services related to charging rechargeable batteries 106, as used within respective computing devices 102. In another instance, the server 112 may be owned or operated by an entity that provides data regarding charging stations and other items of interest to business travelers or other persons. The server 112 may be associated with other entity types, as well, such as an online retailer, travel agency, facilities operator, and so forth.

The server 112 includes a charging module 116. The charging module 116 may include electronic circuitry, a controller or controllers, non-volatile storage media, executable program code, one or more data structures, or any other suitable constituency. The charging module 116 is configured to perform various operations and functions as described herein. In one instance, the charging module 116 is configured to provide a network resource that is accessible by the computing device 102 through the network(s) 114. For instance, such a network resource may be a webpage or webpages hosted by the server 112. The network resource may present, or enable access to, information regarding respective charging stations located within accessible venues. For instance, such venues may be publically accessible, or specifically accessible to the user 104 such as the user's place of employment, a club where the user 104 is member, and so on. Other venue information or selection methods may also be used.

The server 112 may also store charging station data 118 including, but not limited to, venue names, addresses, geo-location coordinates, available charging voltages, available charging capacities or amperages, supported connector or computing device types, usage fees or related costs, security or access requirements, numbers of charging ports, reservation information, goods or services offered by the hosting venue, and so forth. Other data or information may also be included in the charging station data 118. The charging station data 118 may be formatted or stored as one or more data structures, classified or sorted based on respective cities or other geographic regions, and so on.

Also depicted are three respective accessible venues 120. Specifically, venues 120(1), 120(2), and 120(3) are depicted. Each venue 120(1)-120(3) may be an entity such as a retailer, commercial service provider, government office, public facility, and so on. For purposes of non-limiting illustration, the venue 120(1) may be a coffee shop, the venue 120(2) may be an airport, and the venue 120(3) may be a computer store. Other suitable venues 120 may also be considered. The venues 120(1)-120(3) offer respective goods or perform respective services, accordingly.

Further depicted are three respective charging stations 122(1), 122(2) and 122(3). Each of the charging stations 122(1)-122(3) is configured to provide or communicate electrical energy to a respective number of computing devices 102. The charging stations 122(1)-122(3) may include electronic devices, cabling systems, various electrical connectors or docking ports, inductive-type charging pads, a controller or controllers, power conditioning or voltage regulating circuitry, or other suitable constituency. Each charging station 122(1)-122(3) is also coupled to a source of electrical energy, such as line-level voltage provided by a distribution utility, and so on. In one instance, a charging station 122 may operate "off the grid" by way of solar or wind power, or another independent or renewable resource.

Respective charging stations 122 may be in the form of various computing devices 102, the accessory device 502 discussed below, or other devices operated by one or more respective users 104. For instance, a portable computing device 102(1) may include a finder module 108 or other resources enabling it to report the state of its battery 106 or other energy storage device to a corresponding user 104. The computing device 102(1) may then be used to provide electrical energy to another computing device 102(2) in accordance with an expected short-term usage or other need. Thus, various devices having respective primary functions or applications may also serve in a "limited host" mode so as to provide operating energy to the computing device 102 or other devices. The "limited host" may be limited with respect to the charging station 122 in that other features such as data transfer, rapid charging, multiple device charging capability, and so forth may be unavailable on the "limited host". In another situation, a finder module 108 may be configured to seek another device by way of wireless signals 110 which is able to provide or sell energy resources, determine if such a device is a suitable match based on connector types or reserve energy quantities, and so forth.

In some implementations, matches between users 104 may be facilitated based on other criteria, such as content consumption. For example, the user 104(1) may have the accessory device 502 which is fully charged, while the user 104(2) may have a computing device 102 which has an almost empty battery. Both users 104(1) and 104(2) may have consumed the same content, such as reading the same book. Based on this common content consumption, and the need of user 104(2) for a charge, the system may facilitate an introduction of the users 104(1) and 104(2) with something in common (the book) such that the computing device 102 may be charged. While the charging is taking place, the two users 104(1) and 104(2) may discuss the book they have in common.

The owner of the computing device 102(1), accessory device 502, or other device which provides the electrical energy may receive remuneration or other compensation for providing the electrical energy. For example, government-sponsored currency, virtual currency, points, or other value-keeping units may be exchanged in return for providing the electrical energy, the service, or both.

The charging stations 122 may provide other functionality as well. For example, the charging stations 122 may include an access point 113 or equivalent components, and may provide wireless connectivity to the computing devices 102.

An illustrative and non-limiting operation is as follows: The user 104 is operating the computing device 102 in a public environment within a threshold distance or otherwise proximate to the respective venues 120(1)-120(3). The threshold distance may be a fixed value, or may vary based on other conditions. For example, the conditions upon which the threshold distance may be based may include one or more of: time available to charge the computing device 102, departure time for the user 104, time before a next meeting, congestion, estimated travel speed, and so forth. For example, the threshold distance for a particular user 104 scheduled to board an aircraft in 15 minutes may be 200 meters, while the same user 104 scheduled to board an aircraft in 45 minutes may have a threshold distance of 500 meters.

The instantaneous voltage of the rechargeable battery 106 may correspond to or be indicative of the remaining electrical energy stored therein that may be drawn or consumed by the computing device 102. Thus, as usage of the computing device 102 continues, the rechargeable battery 106 exhibits a progressively decreasing voltage.

The finder module 108 includes, or is defined by, an application that runs in the background on the computing device 102. The finder module 108 may use historical operating or usage data for the computing device 102 to estimate operating energy requirements for given periods of time—in particular, future periods of time. The finder module 108 may also use such historical usage data to estimate the amount of time that the user 104 will continue to operate the computing device 102 before it is recharged. Thus, for instance, the finder module 108 is configured to estimate the amount of electrical energy that is likely to be required for the remainder of the present workday.

The finder module 108 monitors, or receives data from other resources that monitor, the voltage of the rechargeable battery 106. The finder module 108 compares the present rechargeable battery 106 charge level, which may be determined or estimated from a present voltage measurement, with an estimated need for the remainder of the present operating period and determines that there is likely to be insufficient stored energy. For instance, the present energy storage level of the rechargeable battery 106 may be 20%, while the finder module 108 estimates that a level of 45% is required to complete the anticipated workday, before the computing device 102 is returned to its home charging station. The finder module 108 further estimates, or determines, that approximately twenty-three minutes of charge time, starting now, would charge the rechargeable battery 106 to the estimated or projected need level of 45%.

The finder module 108 accesses the server 112 using wireless signals 110 as a background operation. For instance, cellular or satellite signaling, wireless Internet, Wi-Fi™, or other wireless signals 110 may be used in the interest of sufficient communications range or other considerations. The finder module 108 provides information regarding the present location of the computing device 102 to the server 112, as may be determined through satellite navigation, cellular positioning, or another suitable technique. Additionally, the finder module 108 requests information regarding charging stations 122 within accessible venues 120 that are near to the present location of the computing device 102, for instance, within five hundred feet. Such a distance or range may be a default value, or may be adjustable in accordance with user 104 input, statistical information, or other factors.

The charging module 116 of the server 112 accesses the charging station data 118, seeking information in accordance with the request sent by the finder module 108. The charging module 116 determines that three such venues—namely 120(1), 120(2) and 120(3) fit the requested information. The charging module 116 also determines that the venue 120(1)—the retail coffee shop—is the nearest of these to the reported location of the computing device 102, and that a charging fee of thirty-five cents applies to those wishing to use the charging station 122(1) located therein. The charging module 116 then sends information back to the computing device 102 including the foregoing information, an address for the venue 120(1), and so forth.

The computing device 102 receives the reply from the server 112 and provides it to the finder module 108. The finder module 108 then interrupts another application that presently being used, such as a spreadsheet application, and presents displayed data 124 on the computing device 102. As depicted, the displayed data 124 includes the present and estimate battery levels of 20% and 45% respectively, the estimated charging time of twenty-three minutes, and the charging fee of thirty-five cents that may be charged to an account of the user 104. The displayed data 124 further includes the name, address, and distance to the nearest venue 120(1), the coffee shop, which includes a publically accessible charging station 122(1). The displayed data 124 may also be communicated from the computing device 102 to another computing device 102 such as a smart watch, smart phone, or other device of the user 104, which may present the displayed data 124.

Concluding the present example, the user 104 is now aware of the need to charge the rechargeable battery 106 if they wish to continue to use the computing device 102 for the remainder of the anticipated workday. The user 104 may then acknowledge the displayed data 124, act in accordance therewith or ignore it, or take other action.

The charging module 116 may be further configured to add to, amend, or delete from the charging station data 118 in accordance with information received from any suitable source. In one instance, information regarding respective venues 120 as received from various users 104, either voluntarily or solicited, may be used to discover new charging stations 122 or to correct existing information, accordingly. In another instance, the operator or entity associated with the server 112 may survey commercial entities, city or county governments, or acquire information from travel or business-oriented services. In yet another instance, the operator of the server 112 may subscribe to an information resource that provides new or amended charger station data 118 on a periodic basis. Other data acquisition techniques may also be used.

In another situation, a user 104 may be in possession of a computing device 102 that has been reported stolen. The user 104 may couple or join such a stolen computing device 102 to a charging station 122. An identity of the stolen computing device 102, such as a serial number or other data, may be communicated to the server 112, which in turn may take corresponding action. In one example, the server 112 may send an alert text message or e-mail to the rightful owner of the stolen computing device 102, if such contact information is known or accessible. In another example, the server 112 may alert an attendant or other responsible person at the venue 120 of the charging station 122, such that police or other authorities may be summoned, or the stolen computing device 102 may be confiscated. In still another example, the server 112 may cause one or more functions or applications of the stolen computing device 102 to be disabled, pending input of a reactivation password that is communicated to the rightful owner. In yet another example, a tracking application or signaling circuitry of the stolen computing device 102 may be activated by the server 112. Other appropriate intervention actions may be taken in view of detecting a stolen computing device 102 by way of a charging station 122.

In one implementation, the computing device 102(1) may be in the form of a watch or other wearable device that communicates by wireless signals 110 with another computing device 102(2) such as a mobile phone or tablet. In turn, the mobile phone may provide one or more services analogous to the server 112, or may access resources connected to the networks 114 and provide connectivity or otherwise relay information to the computing device 102(1). Other devices having respective multi-modal capabilities may also be used.

Figure 2:
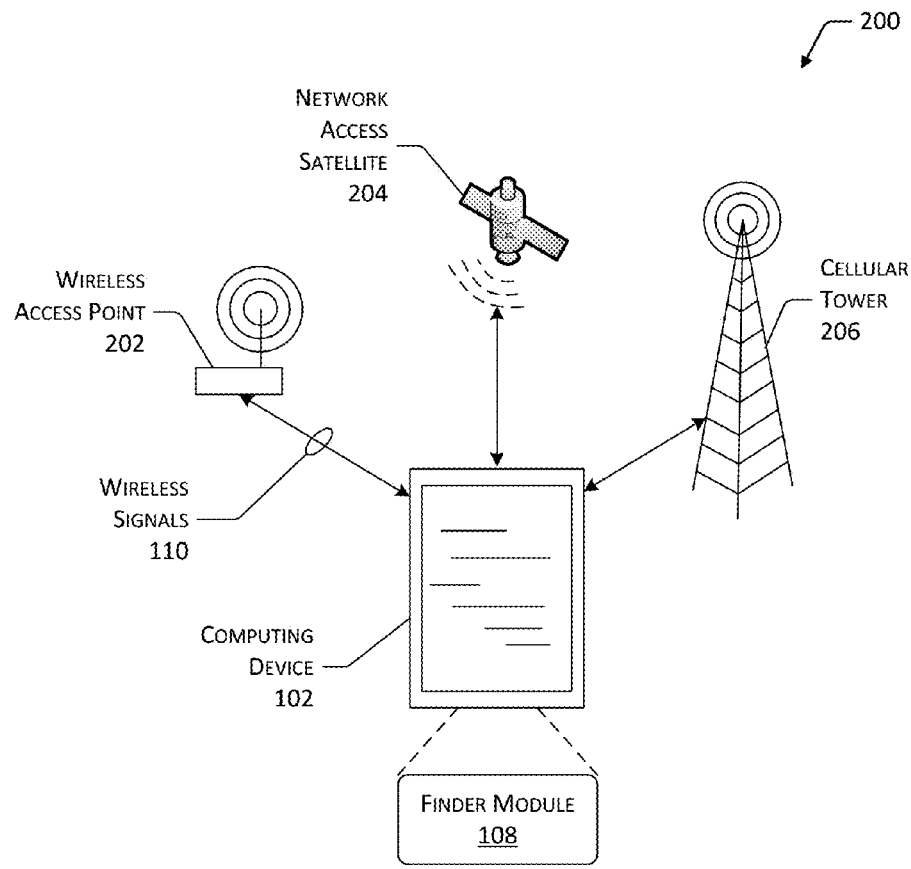
FIG. 2 depicts various devices or systems that may communicate with a computing device by way of wireless signals, and illustrative charging station data.

FIG. 2 depicts views 200 including the computing device 102 and other illustrative elements. The views 200 are non-limiting in nature, and other elements, devices, items, or respective operations are also contemplated.

A wireless access point 202 may be configured to couple the computing device 102 in data or signal communication with various entities such as the server 112, other computing devices 102, and so on, by way of wireless signals 110. For instance, such wireless signals 110 may be in accordance with Wi-Fi®, or another protocol. The wireless access point 202 may be further configured to couple to the network(s) 114. For example, the wireless access point 202 may be located in the coffee shop of the venue 120(1), such that the user 104 may access or browse the Internet using the computing device 102. In particular, the computing device 102 may access information regarding charging stations 122 by way of the wireless access point 202.

A network access satellite 204 may be configured to couple the computing device 102 to the internet-based or accessible resources, such as the server 112, by way of a wireless signals 110 and the network(s) 114. For example, the network access satellite 204 may allow the user 104 to access information regarding charging stations 122 while in a more remote area, such as at highway rest area, while approaching an urban area. Alternatively, the network access satellite 204 may enable such access while the computing device 102 is being used in an urban, outdoor setting such as a city park.

A cellular tower 206 is also depicted. The cellular tower 206 may be configured to couple the computing device 102 in cellular communication with cellular phones, smart phones, other computing device 102, Internet-based or connected resources such as the server 112, and so on. For instance, the user 104 may use the computing device 102 to search for information regarding charging stations 122 by way of wireless signals (i.e., cellular signals) 110 communicated through the cellular tower 206.

Thus, the computing device 102, or various other devices, may access, share or exchange data and information with each other or network 114 connected-entities by way of various wireless pathways. The wireless access point 202, the network access satellite 204, and the cellular tower 206 are just three examples of any number of suitable wireless resources contemplated for use by respective computing devices 102. The computing device 102 or other devices may participate in ad-hoc networks, peer-to-peer networks, or other device groupings or associations for the exchange of data or information, for performing cooperative operations, and so on.

In one example, the user 104 may use the computing device 102 to query the server 112 or another computing entity in regard to charging stations 122 or other services available aboard an aircraft or passenger train. Such a query may be performed in anticipation of travel in the near future, for example. A response to the query may include information regarding charging stations 122, charging ports available at or near to an assigned seat of the user 104, availability of digital content that may be provided or purchased during travel, and so on. In this way, a user 104 may inquire as to what computing device-related facilities or resources will be available while flying, traveling by rail, or during other modes of transport.

Illustrative charging station data 118 is also depicted. The charging station data 118 is structured as a data table, wherein each of the respective rows includes information for a particular venue 120. As depicted, three venues 120 include "coffee shop", "computer store", and "airport", respectively. The charging station data 118 also includes locations 208 for each of the venues 120. Such location information may be provided or formatted in any suitable way, such as street or mailing addresses, geographical coordinates, relative directions from a present base location, and so forth.

For instance, two respective street addresses are shown for two of the venues 120, as these are relatively small commercial entities. As such, the user 104 is relatively close to or within visible distance of the corresponding charging station 122 upon entering either of these venues 102. In contrast, a location in terms of a gate number "B-15" is provided for a charge station 122 located within the "airport", as such a location is relatively vast in area and additional, internal locating information is needed or useful. Additional locating details may also be provided depending upon the nature of a particular venue 120, such as "20 feet inside from front entrance", "adjacent to restroom area", and so forth.

The charging station data 118 also includes a total number of charging ports 210, where such information is known for each of the venues 120. For instance, the charging station 122 accessible at the "coffee shop" includes six total charging ports, and may thus accommodate up to six different computing devices 102. Similarly, the charging station 122 located near gate "B-15" in the "airport" includes sixteen charging ports. The charging ports 210 information is subject to change as charging ports are added or removed, updated information becomes available or is reported, and so on.

The charging station data 118 also includes charging port availability 212 for each of the venues 120. The availability 212 data is subject to rapid change and therefore may only be tracked for those venues 120 that report such information on a real-time or nearly real-time basis. For instance, the "coffee shop" reports that two of the six charging ports are presently available, while the "computer store" is reporting that one of six charging ports are currently unused. In turn, the "airport" venue 120 does not report availability information, and thus "N/A" or "not available" is depicted.

The charging station data 118 further includes a reservation 214 indicator or related information for each of the venues 120. For instance, the "coffee shop" will accept a reservation for a charging port, but will only hold that reservation for the fifteen minutes following the time that it is made. In turn, the "computer store" does not accept charging port reservations. Finally, reservation information for the "airport" is unknown, and thus indicated as "N/A". Other types of information or data may also be included in the charging station data 118, accordingly. The charging station data 118 depicts information regarding three venues 120 in the interest of clarity. However, data structures or tables may include charging station data 118 corresponding to any suitable number of venues 120 and their respective charging stations 122.

The charging station data 118 may also include access 216 information regarding any restrictions or authorizations that a corresponding venue 120 imposes on use of the corresponding charging station 122. For instance, the "coffee shop" and the "airport" venues 120 both offer "public" access to their respective charging stations 122. In turn, the charging station 122 hosted by the "computer store" is only available to members of a charging or services "club". Thus, a particular privilege or group association is required to use the charging station 122 provided by the "computer store" venue 120. The access 216 information may include particular details as to which groups, associations, or security clearances are accepted. Furthermore, the finder module 108 may be configured to locate venues 120 associated with one or more particular groups, or may be configured to locate only publicly accessible venues 120. Other venue 120 filtering or selection criteria may also be used.

The charging station data 118 may also include power parameters 218 information regarding the electrical characteristics of the charging station 122 provided at the corresponding venue 120. Such power parameters 218 may include available voltages, current capacities, connector specifications or identifiers, availability of induction-type charging pads, or other technical data. The finder module 108 may be configured to locate and present venues 120 based upon particular electrical criteria, as well. The charging station data 118 may further include other information or data for the respective venues 120 such as the availability of secured or locking-type charging ports, connector or computing device 102 compatibilities, accessories or other items offered for rental or sales, and so forth. Other information may also be included in the charging station data 118, as well.

Figure 3:
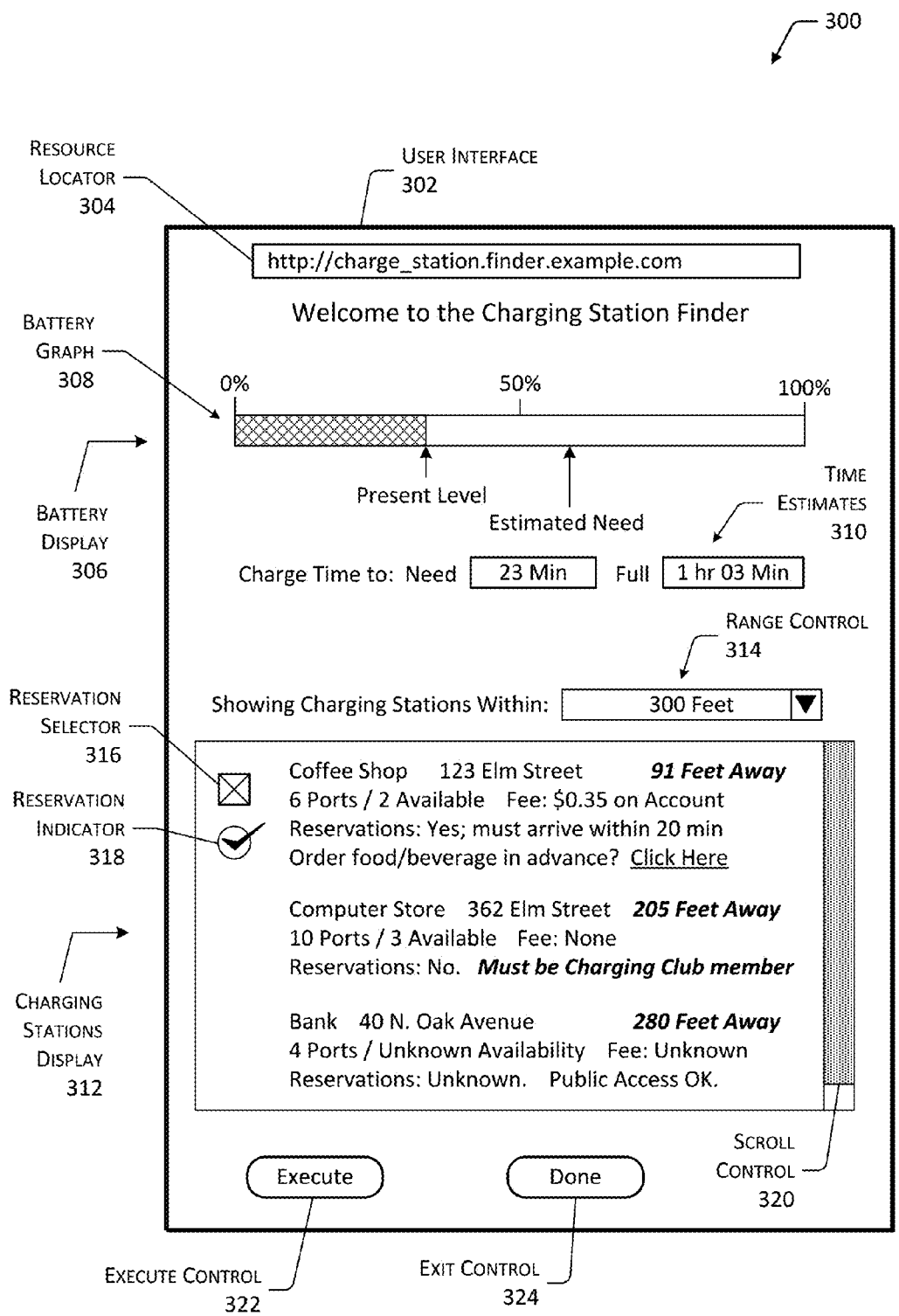
FIG. 3 depicts a user interface including information regarding levels of a rechargeable battery, and information regarding charging stations near to a computing device.

FIG. 3 depicts views 300 including a user interface 302 and respective elements thereof. The views 300 are non-limiting in nature, and other elements, user interfaces, devices, items, or operations are also contemplated.

The user interface 302 may include or indicate a resource locator 304 corresponding to a network resource provided by the server 112. In one instance, the user interface 302 is provided or hosted by the finder module 108 and runs or operates on the computing device 102. Such a user interface 302 presents pieces of information acquired from the computing device 102 or the server 112, or both. Other operating scenarios may also be used. The user interface 302 also receives user 104 input toward selecting or locating charging stations 122 near to a particular geographic location. In another instance, the finder module 108 or the user interface 302, or both, is or are provided as an application running on the computing device 102.

The user interface 302 may also include a battery display 306. The battery display 306 may include a battery graph 308, which indicates a present condition or level of the rechargeable battery 106 of the computing device 102. The battery graph 308 may also indicate an estimated need level, indicative of an amount of energy required to maintain operation of the computing device 102 for a foreseeable period, such as the remainder of a workday or during scheduled travel by aircraft, and so on. The difference between the present level and the estimated need level represents the amount of energy to be added to the rechargeable battery 106 by way of a charging station 122. Additional description regarding the determination of an estimated need value is provided below with respect to FIG. 6.

The battery display 306 may also include time estimates 310, which may include an estimated time required to charge the rechargeable battery 106 from the present level to the estimated need level. The time estimates 310 may also include an estimated time required to charge the rechargeable battery 106 from the present level to a fully charged state. The time estimates 310 may be presented in terms of second, minutes, hours, or any other suitable or convenient units. In this way, the user 104 may be informed as to the need to recharge the computing device 102 in order to maintain operations for the foreseeable time period.

The user interface 302 may further include a charging stations display 312. The charging stations display 312 may include textual or graphical information corresponding to one or more accessible venues 120 that host respective charging stations 122. Such venues 120 may be selected in accordance with a range control 314. The range control 314 allows for user 104 input of a distance value, or selection from a predefined list of distance values, from the present location of the computing device 102.

Once the range control 314 is selected or adjusted, the finder module 108 may then request information from the server 112 regarding charging stations 122 within the user-selected distance of the present location of the computing device 102. In another instance, the finder module 108 accesses charging station data 118 stored within the computing device 102 and selects information for corresponding charging stations 122. Other operations may also be performed.

As depicted, three respective venues 120 are located within three-hundred feet of the present location of the computing device 102, and corresponding information for each is presented. For instance, a "coffee shop" venue 120 is the nearest at ninety-one feet away from the computing device 102 location, and includes six charging port, two of which are presently available for use. Reservations are also accepted at the "coffee shop", but such a reservation is only valid for twenty minutes. The "coffee shop" venue 120 also charges a fee of thirty-five cents, and it is possible to order food or drinks in advance by clicking on an additional control.

A reservation selector 316 may be actuated by user 104 input such as touch gesturing, mouse clicking, or another suitable technique. Activation of the reservation selector 316 may cause the finder module 108 to send a request to reserve a charging port 122 to an entity associated with the "coffee shop" venue 120, to the server 112, or another computing device accordingly. A reservation indicator 318 may visually indicate that the reservation has been accepted or successfully made, in accordance with information or signaling received back from the "coffee shop" entity, or the server 112, and so forth. Other sorts of reservation-oriented controls or indicating devices may also be used. Thus, the user 104 may proceed to the "coffee shop" venue 120 with confidence that a charging port 122 has been reserved for their use.

The charging stations display 312 also includes information or details regarding the other two venues 120, a "computer store" and a "bank". As depicted, the three respective venues 120 are presented in ascending order of distance from the present location of the computing device 102. A scroll control 320 allows for the user 104 to scroll through the charging stations display 312, in the event that numerous venues 120 are identified in accordance with the current location or range criteria. The scroll control 320 may be actuated by drag gesturing, mouse dragging, or other suitable user 104 input.

The user interface 302 may also include other input devices, output devices, or controls, such as an execute control 322 configured to cause the finder module 108 perform an operation, request or select information, and so on, based upon user 104 input to respective controls. The user interface 302 may also include an exit control 324 configured to cause the finder module 108 to shut down or close the user interface 302. The execute control 322 or exit control 324, or both, may be actuated by way of touch gesturing, mouse clicking, or another suitable input technique.

Figure 4:
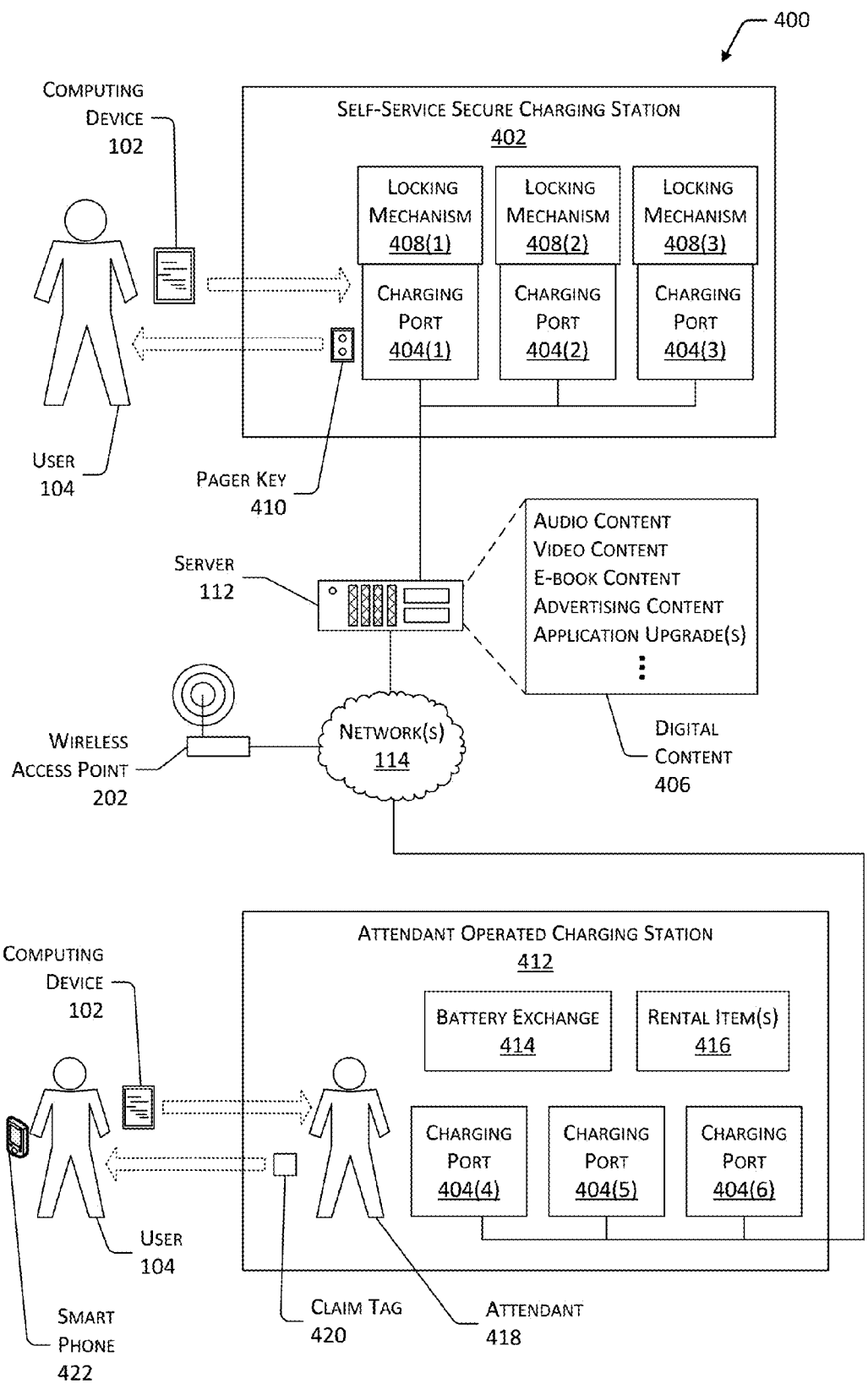
FIG. 4 depicts a block diagram of a system including a self-service secure charging station and an attendant operated charging station.

FIG. 4 depicts views 400 of elements and processes including the charging of a computing device 102 in an accessible venue. The views 400 are non-limiting in nature, and other elements, process steps, items, or respective operations are also contemplated.

A self-service secure charging station (SSSCS) 402 is depicted. The SSSCS 402 may be provided in the form of a kiosk, a booth, a room within another area or space, as a moveable cart, or in another suitable embodiment. The SSSCS 402 includes three respective charging ports 404(1), 404(2) and 404(3). Each charging port 404(1)-404(3) is configured to communicate, or transfer, electrical energy to a computing device 102 so as to recharge one or more rechargeable batteries 106 therein. The charging ports 404(1)-404(3) may include any suitable electrical connectors, docking features, cabling assemblies, inductive charging pads, wireless communication resources, infra-red or optical transceivers, and so on, so as to "mate" with a given computing device 102. The SSSCS 402 is configured such that the user 104 may use, operate, or access features of the SSSCS 402 without assistance from a clerk, attendant, or other person.

Each charging port 404(1)-404(3) is also configured to couple a computing device 102 in data or signal communication with the server 112, such that digital content 406 may be communicated, or downloaded, to the corresponding computing device 102. Non-limiting examples of such digital content 406 include audio files, video files, advertising matter, travel information, digital photographs, maps, e-books, applications files or upgrades, operating systems or upgrades, data structures, and so on. For instance, a user 104 may opt to purchase an e-book and have it downloaded into their computing device 102—such as an e-book reader—while that computing device 102 is being charged by a particular SSSCS 402.

In another instance, the computing device 102 may be configured to disable communication nodes that are otherwise electrically connected to a charging port 404. For example, the respective data lines of a universal serial bus (USB™) port on the computing device 102 may be deactivated while that port is used to receive charging energy from the SSSCS 402. Thus, information cannot be communicated to or from the computing device 102 during the charging process. The computing device 102 is therefore protected against data theft, tampering, operating system or application damage, "hacking", or other malicious operations.

Each charging port 404(1)-404(3) includes a corresponding locking mechanism 408(1), 408(2) and 408(3), respectively, which is configured to lockably secure a computing device 102 in place while it is being charged or communicated with. Locking mechanisms 408 for use with the respective charging ports 404 may include any suitable features or attributes, such as lockable covers or metallic cages that close down over a computing device 102, enclosed lockers or "cubby holes" with lockable doors, and so on. Other features or configurations may also be used.

Each of the charging ports 404(1)-404(3) also includes a pager key 410 that is uniquely associated with that particular charging port 404. As depicted, the pager key 410 is associated with the locking mechanism 408(1) of the charging port 404(1), and none of the others. In one instance, the locking mechanism 408(1) locks, securing a corresponding computing device 102 in place, when the pager key 410 is removed from a corresponding connector port or keyway. In turn, the locking mechanism 408(1) unlocks, thus allowing the computing device 102 to be removed from the charging port 404(1), when the pager key 410 is returned to the corresponding port or keyway.

Additionally, the pager key 410 is configured to receive wireless signals from the SSSCS 402 indicative of a charging status of a computing device 102 being charged by the charging port 404(1). The pager key 410 may, for example, provide a visual, real-time indication of such charging status, provide an audible tone or alert when the charging process is complete, and so on.

A non-limiting operation of the self-service secure charging station 402 is as follows: the user 104 uses the computing device 102 to access the server 112 by way of wireless signals 110. The user 104 then provides input requesting charging services at the SSSCS 402, indicates the time period or level of the desired charge, authorizes any fees or charges, selects digital content 406 for download, and so on. The user 104 then connects the computing device 102 to the charging port 404(1) and closes a hinged, transparent cover of the locking mechanism 408(1) there over, and removes the pager key 410 from its corresponding connector. The transparent cover then locks closed, securing the computing device 102 in place, and the charging and/or download process begins.

The user 104 may then move some appreciable distance away, for example within a transportation terminal or other setting. Sometime thereafter, the pager key 410 provides audible or visible alerts to the user 104, indicating that the charging of the rechargeable battery 106 within the computing device 102 is complete. The user 104 then returns to the SSSCS 402, placing the pager key 410 in contact with its connector. The transparent cover of the locking mechanism 408(1) then unlocks, accordingly, and the user 104 may remove the computing device 102 from the charging port 404(1) and depart from the area.

In another instance, the user 104 is issued a paging device, or may provide communication information about another computing device 102 in their possession. For example, the user 104 may provide a cellular phone number of their smartphone computing device 102(1) while their tablet computing device 102(2) is being charged. The paging device or other computing device 102 may present information to the user 104 regarding state of charge, time remaining until a charging operation is complete, and so on.

Continuing the example, the charging station 122 may send a text message to the user's 104 smartphone computing device 102(1) indicating that the tablet computing device 102(2) is fully charged.

The user 104 may access or unlock the corresponding locking mechanism 408 using a password, combination or code, a signal from a smart watch or smart phone, a mechanical key, or other device. Other methods or systems may also be used.

The SSSCS 402 may also include various batteries 106 that are fully charged and available for rental or purchase by the user 104. For instance, the user 104 may rent a particular battery 106 for use with the computing device 102 at an SSSCS 402 located in a transportation hub, such as a train station. Such rental may be facilitated, for example, by way of a vending machine or other system, wherein payment is made by way of credit card, cash receiving mechanism, online transaction, or the like. The user 104 then installs the battery 106 within the computing device 102 and uses it during rail travel. The user 104 may then return or "drop-off" the rented battery 106 at a corresponding SSSCS 402 at the destination train station, at a designated drop-off bin, or at some other suitable receiving location. Other temporary use or rental scenarios may also be used.

Also depicted is an attendant operated charging station (AOCS) 412. The AOCS 412 may be provided in the form of a kiosk, a booth, a room, as a moveable cart, or in another suitable embodiment. The AOCS 412 includes three respective charging ports 404(4), 404(5) and 404(6). Each charging port 404(4)-404(6) is configured to transfer electrical energy to a computing device 102 so as to recharge one or more rechargeable batteries 106 therein. The charging ports 404(4)-404(6) may include any suitable electrical connectors, cabling assemblies, docking features, inductive charging pads, wireless communication resources, infra-red or optical transceivers, and so on, so as to "mate" with a respective computing device 102 or other apparatus.

Each charging port 404(4)-404(6) is also configured to couple a computing device 102 in data or signal communication with the server 112 by way of the network(s) 114, such that digital content 406 may be communicated or downloaded to a corresponding computing device 102. For instance, the user 104 may opt to purchase an electronic atlas for an area and have it downloaded into their computing device 102 while that computing device 102 is being charged by a particular AOCS 412.

The AOCS 412 may also include a battery exchange 414 program or system. The battery exchange 414 may include rechargeable batteries 106 characterized by various makes, models, configurations, capacities, and so forth, which are pre-charged and ready to be used by respectively varying computing devices 102. In one instance, the user 104 exchanges their existing rechargeable battery 106 for a pre-charged unit available from the battery exchange 414. A fee or additional service cost may also be applied. In this way, a computing device 102 is effectively "recharged" almost instantaneously, allowing the user 104 to depart from the AOCS 412 immediately.

The AOCS 412 may further include respective rental items 416. Such rental items 416 may include, without limitation, charging or data signaling cables, connectors, adapters, wall chargers or "bricks", portable charging stations or accessory devices, batteries, carrying cases, and so forth. Other rental items 416 may also be provided. The AOCS 412 may offer to sell one or more of the respective rental items 416, or other items may be designated for sale only, as well. In one instance, a user 104 may rent a fully charged battery 106 from an AOCS 412 at a departure airport, draw energy from the rented battery 106 for use of the computing device 102 during flight, and then return the rented battery 106 to another AOCS 412 at a destination airport. Other acquisition-and-return scenarios may also be used. For example, the user 104 may purchase the battery 106 before travel and return after travel for a partial refund or credit.

Operating or "life time" data for respective rental batteries 106 may be tracked and used for various purposes. For example, the charge and discharge cycling history of a particular battery 106 may be recorded and used toward predicting an end-of-life date or estimating a present resale value for that battery 106. In another example, a given battery 106 may not be offered for rental based on a relatively heavy usage history—that is, such a particular battery 106 may not be reliable for intensive or extended operations. In yet another example, usage data may be used to track energy storage capacity for use in estimating operating times. Energy usage or battery 106 operating data may be applied to other operations, as well.

A non-limiting operation of the AOCS 412 is as follows: the user 104 approaches the AOCS 412 and is greeted by an attendant 418. The user 104 requests full recharging of their computing device 102, and provides for payment of any fees or other costs by way of a credit card. The attendant 418 then receives the computing device 102 from the user 104 and connects it to the charging port 404(5), wherein the charging process begins. The attendant 418 then provides a claim tag 420 to the user 104 for use in claiming their computing device 102 later on. Furthermore, the user 104 provides a cellular phone number, for a smart phone 422, to the attendant 418. In another instance, the computing device 102 includes a cellular phone number or other contact information corresponding to the smart phone 422 or another computing device 102 associated with the user 104.

The user 104 may then leave the immediate area, engage in other activities, and so forth, while waiting for the rechargeable battery 106 within their computing device 102 to be recharged. Meanwhile, the attendant 418 may provide the cellular phone number to the server 112 along with information identifying the computing device 102, method of payment, or other information obtained from the user 104. Additionally, the computing device 102 may communicate identifying information or other data to the server 112 without attendant 418 intervention. At some later time, the computing device 102 is fully charged, and a corresponding message is communicated through the charging port 404(5) to the server 112. The server 112 then sends a text message to the smart phone 422 indicative of the completed charging task. The user 104 may now return to the AOCS 412, and exchange the claim tag 420 for the computing device 102 by way of the attendant 418.

In another example, the user 104 may bring the computing device 102 to the AOCS 412 or another point-of-sale location, seeking to exchange the computing device 102 for a newer unit, or a different make or model. The attendant 418 may then digitally photograph the exterior features and condition of the computing device 102, initiate a diagnostic check or other automated evaluation of the computing device 102, or perform other actions. Data files, applications, digital photographs, audio or video content, and so forth, may then be transferred from the computing device 102 into the replacement unit. Other "trade-in" or exchange operations may also be performed.

In another instance, the same or a similar a "trade-in" procedure may be performed by way of a self-service charging station or self-service secure charging station 402. In particular, the user 104 may approach the SSSCS 402 and provides input to either the computing device 102 or a terminal or other input device indicating that the user 104 wishes to exchange the computing device 102 toward a newer or different unit. A camera, optical or laser scanner, or other device may be used to evaluate the present condition of the computing device 102 and provides corresponding images or data to the server 112, or to a remote device or operator. Diagnostics or other procedures may also be performed toward evaluating or rating the condition of the computing device 102, such that an exchange value may be determined or estimated.

The user 104 may then surrender the computing device 102 to an automated receiving system, and corresponding credit value toward another device is provided by way of a credit card, online debit account, or other suitable procedure to the user 104. Additionally, data or media files, user profile settings, applications, operating system enhancements, and so on, may be transferred to a replacement computing device 102 at that time, or uploaded to the server 112 for later download when a replacement computing device 102 is acquired by the user 104. Other procedures may also be performed.

In another instance, the finder module 108 may assist a user 104 so as to identify a kiosk or other location that includes a matching computing device 102, such as a tablet computer, as they are presently using, but with a battery which has more charge. The matching computing device 102 may include the same memory, exhibit a same or similar overall physical condition, may have the same or similar features, same or compatible installed software, and so forth.

The user 104 may then select that kiosk and pick up a fully-charged, fully-resourced replacement computing device 102 therefrom within a certain time period. While the user 104 is in route to the kiosk, the user's present computing device 102 is communicating with the server 112 so as to provision the replacement computing device 102 with the same settings, user preferences, data files, or other content. Additional content or data may also be downloaded into the replacement computing device 102, such as a movie from the user 104 "watch list" or other reference file that the user 104 has on their present computing device 102. The data or file transference to the replacement computing device 102 may be performed by way of secure elements, such as trusted platform modules (TPMs) or other techniques.

Such an operation may help in situations where the computing device 102 does not have an easily replaceable battery 106, and where the user 104 does not have enough time to charge the battery 106 to an "estimated need" level. The computing device 102 that is surrendered in the exchange can then be inspected by an attendant 418, or may be sent to some centralized inspection facility to evaluate the condition thereof. If the surrendered computing device 102 is of the same or comparable condition as the replacement computing device 102, then no further actions may be needed.

However, if the surrendered computing device 102 is of lesser condition, or damaged, an account of the user 104 may be automatically charged the difference in value. Alternatively, a fee to bring the surrendered computing device 102 back to a minimum threshold of usability, which may involve replacing the battery 106, display, or other elements. If the surrendered computing device 102 is in better condition than the replacement computing device 102, an account of the user 104 may be credited the difference. The attendant 418 or a central facility may service or refurbish the surrendered computing device 102, recharge the battery 106, and use the refurbished computing device 102 to restock the kiosk or another location.

In still another example, numerous users 104, such as students within an elementary school, high school, college, or another educational or academic institution, may use computing devices 102 that are owned or administrated by the corresponding institution. Such computing devices 102 may be the same type or model, or may vary, and may be tablet computers, e-book readers, media viewers, laptop or wearable computers, or other suitable devices. Such computing devices 102 may be collected at a charging station 122, kiosk, receiving office or booth, or other designated location as part of a periodic routine for recharging or consumables replenishment, diagnostic evaluation, inspection of physical condition, installation or upgrade of digital content, or other procedures.

A particular computing device 102 may be assigned to a particular student user 104 for the duration of an academic time period, such as a semester or school year. Such assignment may be based on a serial number, a tagging element such as a radio-frequency identification device (RFID), acquisition and storage of a biometric characteristic or "signature" of the user 104, or another unique association of the user 104 with the computing device 102. Alternatively, respective computing devices 102 may be issued to respective student users 104 during a daily, weekly, or other periodic distribution, wherein each user 104 is associated with a particular computing device 102 each time, such that a particular computing device 102 is used by numerous different users 104 over the course of an academic year, for example. Other processes may also be used. User 104 profile information or user-established settings, customized preferences, particular applications, data files, and so on, may be transferred from a surrendered computing device 102 to a replacement computing device 102, if an exchange of such computing devices 102 is performed. Alternatively, such user-specific data or information may be communicated to the server 112 for later download to an exchange computing device 102 as part of an exchange process.

Computing devices 102 may be scanned or evaluated to detect usage or conditions which may be beyond previously established thresholds or standards. For example, the computing devices 102 may be scanned to determine changes in installed software, such as if malicious or unauthorized software is present on the computing device 102. In another example, the computing device 102 may be analyzed to detect unauthorized use, storage of inappropriate material, or other policy violations. The computing devices 102 may be analyzed subsequent to collection from the users 104, such as after the students deposit their computing devices 102. Similar or respectively varying procedures may be used with respect to numerous computing devices 102 associated with members of a group or club, personnel within a clinic or hospital, workers or operators at an industrial site, or in other situations or environments.

Figure 5:
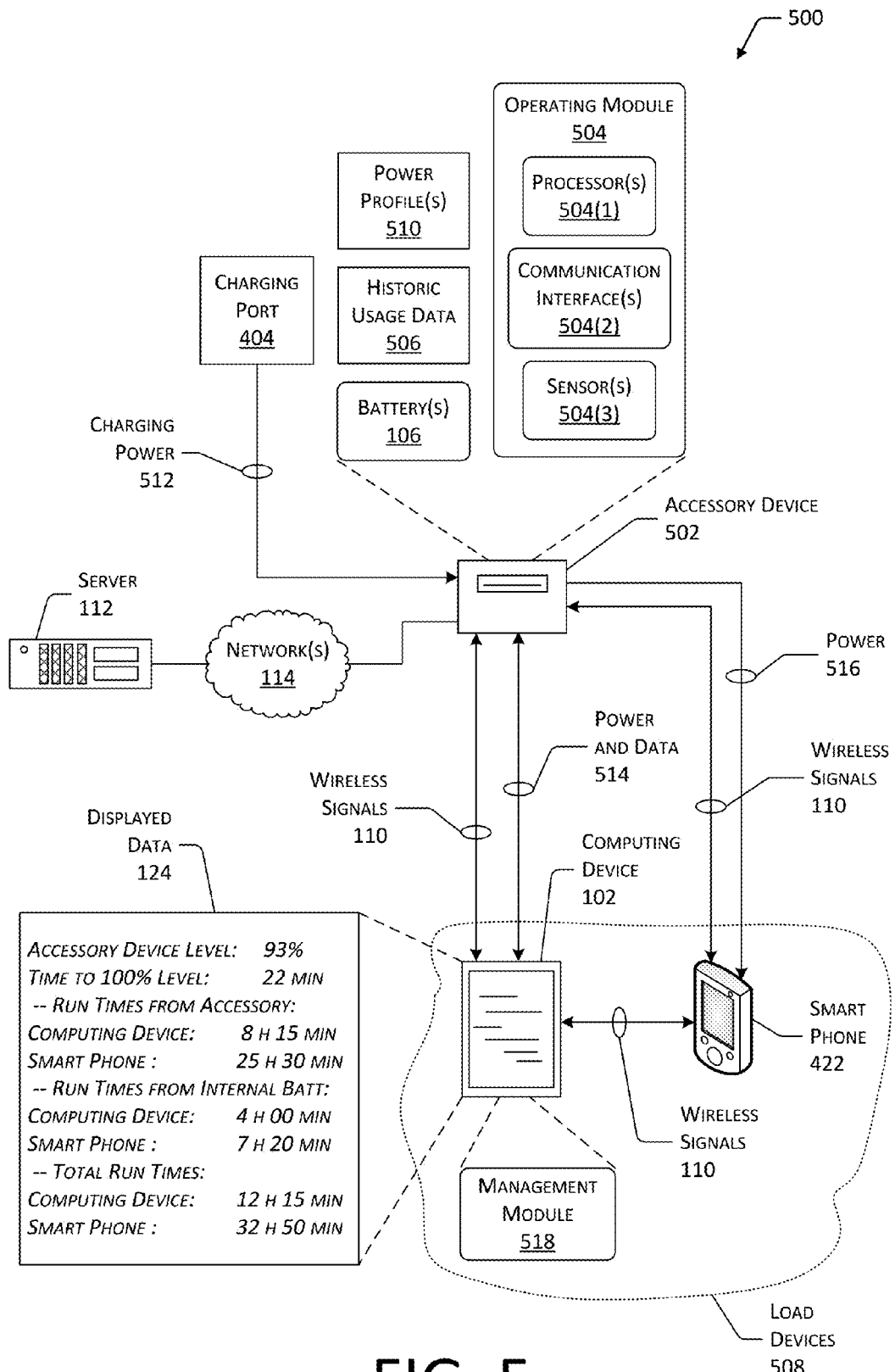
FIG. 5 is a block diagram depicting a system including a charging accessory, and respective load devices electrically coupled to the accessory device.

FIG. 5 depicts views 500 of elements and processes including the use of an accessory device 502. The views 500 are non-limiting in nature, and other elements, process steps, items, or respective operations are also contemplated.

The accessory device 502 may include one or more rechargeable batteries 106. In another instance, the accessory device 502 may include a fuel cell, a capacitor, a super capacitor, or other energy storage devices. Such an energy storage device or devices are thus "rechargeable" or "replenishable" by way of electrical energy, chemical energy or chemical refill, hydrogen-based fuel, one or more fuel cell reactants, or another consumable resource that may be acquired from a suitable source. For example, the accessory device 502 may comprise a plurality of the rechargeable batteries 106 and be described as a rechargeable battery pack. In another example, the accessory device 502 may comprise a plurality of the fuel cells, capacitors, and so forth, and be described as a rechargeable energy pack. The accessory device 502 may also be referred to as a rechargeable energy pack 502 or rechargeable battery pack 502, as well.

The accessory device 502 may include power transistors or other switching elements configured to couple two or more batteries 106 in various series, parallel, or series-parallel circuit configurations. Thus, the batteries 106 of the accessory device 502 may be selectively electrically reconfigurable so to provide different voltages or charging currents, or accommodate other electrical parameters.

The accessory device 502 also includes an operating module 504. The operating module 504 may include electronic circuitry or respective electronic circuits, one or more processors 504(1), computer-executable code stored on non-transitory storage media, indicating lights or an electronic display, pushbuttons or other user input devices, and so forth. The operating module 504 may also include wired or wireless communication interfaces 504(2) configured to communicate data, information, or other signals with other devices or entities.

The operating module 504 may further include one or more respective sensors 504(3). The sensor(s) 504(3) may include one or more thermometers for measuring battery 106 temperature or ambient temperatures, a global positioning system (GPS) receiver or other satellite-based locating resource, an ambient light sensor, or various other detectors or instrumentation. The operating module 504 may include other suitable constituency, as well. The operating module 504 is configured to perform or control various operations of the accessory device 502. The accessory device 502 may also include one or more components or elements as described herein for the computing device 102. Thus, the accessory device 502 is not limited with respect to any suitable resources or functions that it may include.

The accessory device 502 may be configured to perform various respective functions, or include one or more accessories, as well. In one instance, the accessory device 502 may include a detachable flashlight or other convenience. In another instance, the accessory device 502 also functions as a "digital wallet" for the user 104, wherein virtual currency or digital tokens may be communicated therefrom to a smart phone or other device. The accessory device 502 may include a near-field communication (NFC) module to facilitate the communication of these digital tokens, virtual currency, or other data. In yet another instance, the accessory device 502 is configured and resourced to operate as a Wi-Fi™ "hot spot". Other functions or operations may also be included.

The accessory device 502 may also include historic usage data 506. The historic usage data 506 may be stored on storage media, organized as one or more various data structures, and so forth. The historic usage data 506 may include, describe, or quantify information regarding power consumption by one or more respective load devices 508, such as computing devices 102, power tools, media devices, wearable computers, portable appliances, test equipment, diagnostic devices, and so forth. For instance, the historic usage data 506 may include data regarding power or electrical current consumption over time as a particular load device 508 is used to perform various tasks. In another example, the historic usage data 506 may be used to provide a reminder to a user 104 to recharge batteries 106 within portable power tools before heading to a worksite at the beginning of a workday. The historic usage data 506 may also be used in other ways.

In another instance, the historic usage data 506 may include one or more "power curves" or functions quantifying energy consumption for a given load device 508 over a particular period of time, such as a specific or averaged workday, weekend day, and so forth. The historic usage data 506 may be acquired from respective load devices 508, such as the computing device 102 or the smart phone 422, or may be generated by operation of the operating module 504, or acquired or generated by way of other operations.

The historic usage data 506 may correspond to one or more load devices 508 that do not include wireless, network-based, or other communications capabilities. For instance, the accessory device 502 may measure, track, or record historic usage data 506 for a particular device that is not configured to communicate such information to the server 112 or another entity. The accessory device 502 may then process such historic usage data 506, forward that historic usage data 506 or corresponding information to the server 112, or perform other operations on behalf of that device. For instance, the accessory device 502 may be configured to provide a certain amount of energy—for example, 500 milliampere-hours—to the computing device 102, determining that the energy storage of the computing device 102 is now "full". This energy provisioning data may be used by the operating module 504 for future estimating purposes, communicated to the server 112, and so on.

The accessory device 502 may also include one or more power profiles 510. Each power profile 510 may predict or "model" energy consumption over time corresponding to a particular task or function performed by a given load device 508. For instance, a power profile 510 may predict electrical consumption by the computing device 102 during the presentation of a 2-hour audio/video presentation or movie. In another instance, a power profile 510 may predict electrical consumption by the smart phone 422 during a cellular phone call of 10 minutes duration. In yet another instance, a power profile 510 may predict electrical consumption by the computing device 102 during an upcoming 4-hour flight. Other units of measure, time correspondences, and so forth, may be used to define respective power profile 510.

Such power profiles 510 may be predefined and acquired from a manufacturer, vendor, or other source associated with a particular load device 508. In another example, power profiles 510 corresponding to respective applications running on particular load devices 508 may be acquired from sources or vendors of those applications. In one case, a power profile 510 may be defined in terms of instantaneous power consumption, such as Watts, which may be multiplied by a period of time, such as minutes or seconds, in accordance with an actual or estimated usage time for that application. In another case, a power profile 510 maybe defined in terms of total power consumption, such as milliampere-hours, over a predetermined period of time, such as 1 hour. In still another case, the operating module 504 may record historic usage data 506 for a particular load device 508, and then process that historic usage data 506 so as to generate one or more power profiles 510. Other power profile 510 methodologies may also be used.

The accessory device 502 may be configured to be coupled to an external source of electrical energy, such as a charging port 404. Charging power 512 is then received by the accessory device 502 and used to charge the battery 106 under the control of the operating module 504. The charging power 512 may be alternating current (AC), direct current (DC), or characterized by respectively different voltages. In another instance, the accessory device 502 may be equipped to receive electrical energy from an external source by way of wireless power transfer.

The operating module 504 may also control provisioning of electrical power to respective load devices 508. In one example, the accessory device 502 includes a USB™ port that is configured to connect to the charging port 404 and to receive the charging power 512. Other protocols may also be used, such as a serial or parallel communications port, Firewire®, Apple desktop bus (ADB), High-Definition Multimedia Interface (HDMI)®, or other suitable protocols and their corresponding connectors. In turn, the accessory device 502 may be further configured to disable data or communication lines of the USB™ port so as to prevent damage or data theft by malicious entities. In another example, the accessory device 502 may include a USB™ or other port that is completely lacking data or communication lines, and is thus configured for charging purposes only.

In yet another example, the accessory device 502 may be equipped to provide charging power to respective load devices 508 by way of wireless power transfer or other devices. In still another example, the operating module 504 may prioritize or apportion the allocation of power to respective load devices 508 based on the historic usage data 506, one or more of the power profiles 510, upcoming events such as air travel or a vacation, and so on. Other suitable configurations or methods may also be used.

In another instance, the operating module 504 of the accessory device 502 may use the historic usage data 506, one or more of the power profiles 510, or some combination of these to estimate future energy requirements of one or more load devices 508. The operating module 504 may then use the estimate or estimates to calculate or determine a quantity of energy to be stored in the battery(s) 106 of the accessory device 502, and control charging of the battery(s) 106 accordingly. Thus, the accessory device 502 may be configured to "store up" sufficient energy, as received from the charging port 404 or another external source, so as to provide for predicted energy needs of various load devices 508 during future operations, such as during business travel, vacationing, and so forth.

For example, the computing device 102 may be coupled to the accessory device 502 by way of a wired connection such that power and data 514 may be communicated there between. In one example, the power and data 514 are communicated using a USB™ protocol. Information regarding present battery 106 levels of the computing device 102 or the accessory device 502, or both, may be shared between these respective devices by way of the power and data 514. The computing device 102 and the accessory device 502 may also be respectively configured to communicate data or information with each other using wireless signals 110, such as Wi-Fi™, Bluetooth®, and so on.

Additionally, the historic usage data 506, one or more of the power profiles 510, or other data or information may be communicated between the computing device 102 and the accessory device 502. The power and data 514 may further provide electrical energy from the accessory device 502 to the computing device 102 for recharging or replenishing the battery 106 or other energy storage device thereof.

In another instance, the accessory device 502 may provide power 516 to the smart phone 422 by way of a wired connection. Thus, the accessory device 502 may provide electrical energy for recharging or replenishing an energy storage device, such as a battery 106, of the smart phone 422. As depicted, the smart phone 422 may be configured to communicate a present level of such an energy storage device, historic usage data 506, power profiles 510, or other data or information to the computing device 102 by way of wireless signal 110, such as Wi-Fi™, Bluetooth®, and so forth.

The computing device 102 may also include a management module 518. The management module 518 may include any suitable constituency, such as electronic circuitry, dedicated purpose electronic devices, a processor device, executable program code stored in non-transitory storage media, and so forth. Other suitable elements or devices may also be included or used. The management module 518 may be configured to communicate data or information to and from the smart phone 422, the accessory device 502, or both of these or other devices. The management module 518 may also be configured to present information to a user 104 regarding the status of battery 106 charging operations, estimate available operating times for the respective load devices 508, and perform other operations.

The management module 518 may also be configured to prioritize the allocation of battery 106 energy to certain applications or resources of the computing device 102. For instance, the user 104 may provide input indicating that e-mail and word processing applications have a higher priority than a movie playback application while the computing device 102 is being used during travel. Thus, the management module 518 may be configured to disable user-designated applications or functions during travel or other circumstances, so as to conserve stored energy in the battery 106 for business purposes. In another instance, the management module 518 may be configured to prioritize or curtail energy provisioning to certain resources, functions, or applications of the computing device 102 based on historic usage data 506 or power profiles 510—that is, to manage power allocation without need for user 104 intervention. Other energy management functions may also be used.

The accessory device 502 may be further configured to communicate with the server 112 by way of the one or more networks 114. The accessory device 502 may acquire or supplement the historic usage data 506 or the power profiles 510, or both, in this way. The accessory device 502 may also acquire digital content 406 from the server 112 for storage within media of the accessory device 502, for communication to the computing device 102, and so on. For instance, the accessory device 502 may communicate data, energy levels, time periods, or other information regarding the charging of a battery 106 or other energy storage device within one of the load devices 508. Other operations or functions may be performed by way of power and data 514 signaling between the server 112 and the accessory device 502.

In one illustrative and non-limiting operation, the user 104 couples the accessory device 502 to a charging port 404. The operating module 504 then controls or regulates the charging of the battery(s) 106 using the charging power 512. The user 104 then allows sufficient time for the battery(s) 106 of the accessory device 502 to charge to a level of, for instance, 93% of their total energy storage capacity. The user 104 then disconnects the accessory device 502 from the charging port 404, packing it along with the computing device 102 and the smart phone 422 in preparation for business travel. In one example, the accessory device 502 may communicate data to or from the charging port 404 during the receiving of charging power 512 therefrom. For instance, a USB® or other port of the accessory device 502 may be used for both data communication and charging power 512 reception.

Upon arriving at a transportation hub, the user 104 connects the computing device 102 and the smart phone 422 to the accessory device 502 by way of respective wired connections. The smart phone 422 communicates a present level of its battery 106 to the computing device 102 by way of wireless signals 110. In turn, the computing device 102 communicates the present battery 106 level of the smart phone 422 to the accessory device 502 by way of the power and data 514. The computing device 102 communicates the present level of its own battery 106 to the accessory device 502, as well.

The operating module 504 then accesses the historic usage data 506, or one or more of the power profiles 510, and uses these along with the respective battery 106 levels, to estimate potential operating times for the computing device 102 and the smart phone 422, respectively. In one instance, the estimated operating times may be based on "worst case" or "pessimistic" power profiles 510, wherein it is assumed that operations at or near maximum power consumption intensity may be performed by the computing device 102 or the smart phone 422, or both. In another instance, the estimated operating times may be based on historic usage data 506 corresponding to previous business travels. Other estimating methods may also be used.

Moreover, estimated operating times may be based on the present level of the battery(s) 106 of the accessory device 502, while other estimated operating times are based on the present levels of the battery 106 of the computing device 102 and the smart phone 422, respectively. Other estimated operating times or basis may also be used. The respective operating time estimates and battery 106 levels are then communicated to the computing device 102 by way of the power and data 514 signals.

The management module 518 receives the operating times and battery 106 levels and uses this information to present displayed data 124. As depicted, the present level of 93% of the accessory device 502 presented, as well as a time estimate of 22 minutes to charge the accessory device 502 to 100% of capacity. Such charge time information may be useful to the user 104 in the event that an opportunity to fully charge the accessory device 502 presents itself.

As also depicted, it is estimated that the accessory device 502 stores sufficient energy within its battery(s) 106 to power the computing device 102, alone, for a total of 8 hours and 15 minutes. In turn, it is estimated that the accessory device 502 stores sufficient energy to power the smart phone 422, alone, for a total of 25 hours and 30 minutes.

As further depicted, it is estimated that the computing device 102 has enough energy within its own battery 106 to operate for 4 hours and zero minutes, while it is estimated that the smart phone 422 has sufficient stored energy to operate for 7 hours and 20 minutes. Finally, total estimated operating times of 12 hours and 15 minutes for the computing device 102, and 32 hours and 50 minutes for the smart phone 422, are depicted. These total operating times are based on transferring the stored energy of the accessory device 502 to the computing device 102 or the smart phone 422, respectively.

Figure 6:
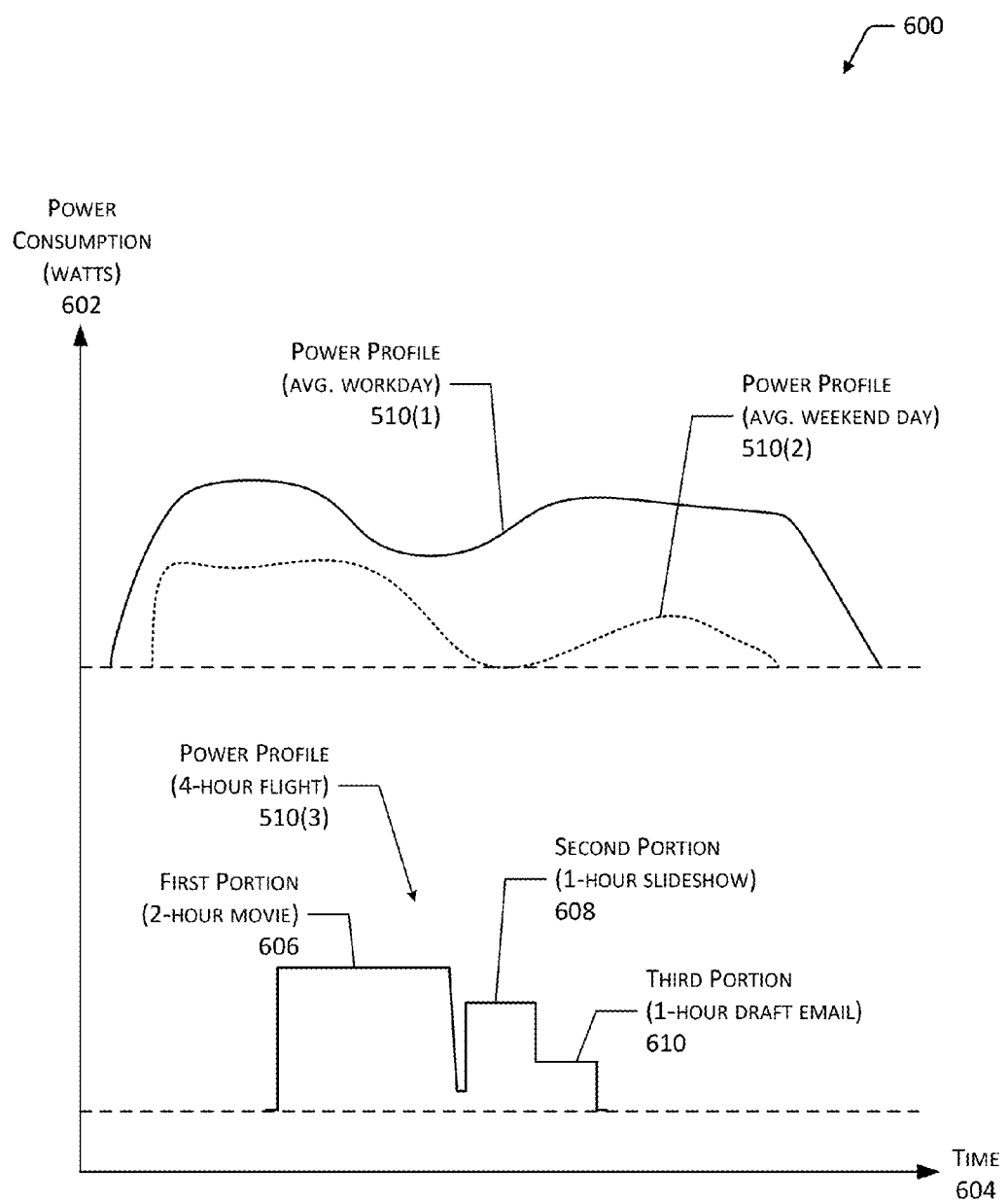
FIG. 6 is a function diagram depicting respective power profiles corresponding to a computing device.

FIG. 6 depicts views 600 include respective power profiles 510. The power profiles 510 and their respective characteristics are illustrative and non-limiting in nature, and other power profiles 510 having other respective characteristics are also contemplated.

A power profile 510(1) depicts a time-dependent, average power consumption curve for a particular load device 508. For instance, the power profile 510(1) may depicts the average power consumption profile for the computing device 102 over the course of a workday. Specifically, the power profile 510(1) is a curve, or locus, defined by a multitude of instantaneous power consumption 602 values, in units of Watts, plotted with respect to time 604. Thus, the power profile 510(1) may correspond to various operations that are performed by the computing device 102, such as viewing or answering e-mail, generating an electronic document, producing a business presentation or slideshow, and so on, by way of one or more respective applications. The power profile 510(1) may be used to predict or estimate the battery 106 level that is required to operate the computing device 102 for an average workday.

The power profile 510(2) depicts a time-dependent power consumption curve for a particular load device 508, such as the computing device 102, over the course of an average weekend day. The power profile 510(2) may be indicative of operations such as answering e-mail, accessing social media, playing a game, locations where various operations or communication were performed, and so forth, using respective applications. For instance, locations where wireless connectivity is weak or intermittent may result in increased energy consumption from a battery 106. Thus, location may be germane to one or more respective power profiles 510. It is noted that the power profile 510(2) is indicative of both overall energy consumption and intensity that are lesser than that of the power profile 510(1).

Thus, as depicted in this example, more energy is drawn from the battery 106 of the computing device 102 during the course of an average weekday relative to an average weekend day. The power profiles 510(1) and 510(2) may be used by the operating module 504, or the management module 518, or both, in order to estimate required battery 106 levels for operating during weekdays or weekend days, respectively. Moreover, the power profiles 510(1) or 510(2) may be adjusted or modified over time as computing device 102 usages or energy consumption patterns change.

In one instance, the server 112 acquires historic usage data 506 from a single computing device 102, or from a population of respective computing devices 102, and generates or adjusts respective power profiles 510 accordingly. Such acquisition, processing, or generation may be performed either continuous in real time, periodically in a batch-like manner, or both. These adjusted power profiles 510 may then be communicated to respective computing devices 102, to accessory devices 502, and so on. Thus, "cloud" based acquisition or processing of historic usage data 506, or the generation of respective power profiles 510, is contemplated. In another instance, the management module 518 of the computing device 102 generates or adjusts respective power profiles 510 over time in accordance with detected energy consumption patterns or trends. In yet another instance, the operating module 504 or other resources of the accessory device 502 may acquire historic usage data 506 or generate or adjust various power profiles 510. Other methods may also be used.

Also depicted is an illustrative power profile 510(3), corresponding to energy consumption over time for a computing device 102 used during a 4-hour flight. The power profile 510(3) includes a first portion 606 indicative of energy used during presentation of a 2-hour movie. The power profile 510(3) also includes a second portion 608 corresponding to energy used during a 1-hour business slideshow. The power profile 510(3) also includes a third portion 610 corresponding to energy used while drafting e-mail messages for 1 hour.

In one respect, the power profile 510(3) is defined in a piece-wise manner, in accordance with three respective operations or tasks: viewing a movie, viewing a slideshow, and composing e-mail messages. In one example, the power profile 510(3) may be used by the management module 518 in order to estimate power consumption and required battery 106 level for an upcoming flight as indicated by a calendar function on the computing device 102. In another example, the respective portions 606-610 of the power profile 510(3) may be used by the operating module 504 so as to estimate a required battery 106 level in accordance with respective functions to be performed using the computing device 102. Other operations using the respective power profiles 510(1), 510(2) or 510(3) may also be performed.

One or more of the respective power profiles 510(1)-510(3) may be based at least in part on corresponding historic usage data 506. In another instance, one or more of the respective power profiles 510(1)-510(3) may be generated by either the operating module 504 or the management module 518, or both, based on detected or inferred load device 508 usage patterns. For example, if the user 104 acquires digital content 406, such as a movie, and a calendar function of the computing device 102 indicates that a flight is scheduled for the near future, the management module 518 may estimate the battery 106 level required to view the movie during the flight. In another example, a particular power profile 510 may be generated by an engineer or other skilled user 104 as one of numerous power profiles 510 corresponding to travel-related load device 508 usage.

The power profiles 510 or respective portions 606-610 thereof may also be used to dynamically adjust power consumption by the computing device 102, or other energy-consuming device such that operations may be performed for a particular period of time before recharging. For example, the management module 518 of the computing device 102 may estimate that 5 more hours of operating time are likely required before a routine recharging of the battery 106 begins. Based on the present level of the battery 106 and a corresponding power profile 510, the management module 518 determines that certain resources of the computing device 102 should be shut down or inactivated so as to conserve sufficient energy to allow for the predicted 5 hours of operation.

Continuing the present example, the management module 518 may present information regarding recommended energy conservation efforts, which may include a number of options for the user 104 to choose from. For instance, the user 104 may elect to shut down a wireless modem or other communications resource, as such is not foreseen as being needed for the remaining operating period. In another instance, the user 104 may be prompted to authorize the inactivation of one or more applications toward reducing processor load and thus decreasing energy consumption. Shut down operations may be repeated or intensified incrementally over time so as to provide for the remainder of the estimated operating time.

In another example, the management module 518 may shut down one or more resources of the computing device 102 as an automatic or "background" operation, without user 104 prompting or intervention, based on present or near-future circumstances. For instance, the management module 518 may determine that the computing device 102 is presently being used during a business flight by accessing a travel scheduling entry within a calendar. If the computing device 102 is being used to view a movie during the flight, the management module 518 may shut down one or more wireless functions, a radio receiver, or other resources not germane to the present usage. The management module 518 may also access one or more power profiles 510 toward determining or prioritizing one or more resources that may be shut down during travel or other circumstance. In yet another example, the management module 518 may periodically inactivate or shut down selected resources in the interest of energy conservation and extended operating time for the computing device 102. For instance, the management module 518 may inactivate an application running in the background from time to time, re-activating it only when needed so as to reduce processor workload and conserve energy accordingly. Other energy conservation measures may also be automated such that the user 104 is unaware of their occurrence.

Figure 7:
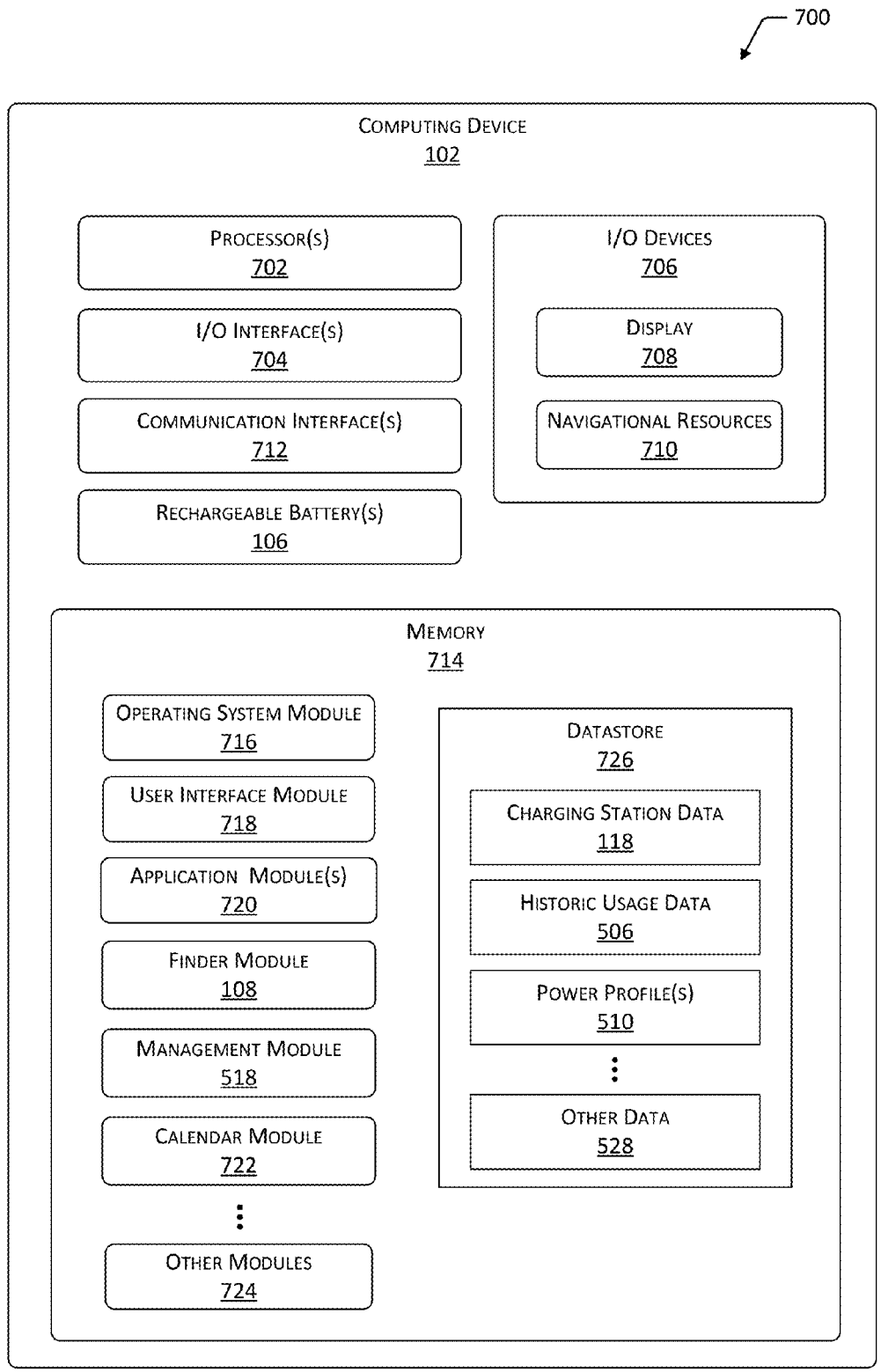
FIG. 7 is a block diagram depicting a computing device.

FIG. 7 illustrates a block diagram 700 of a computing device 102. The computing device 102 is illustrative and non-limiting, and may be defined by a desktop computer, a tablet computer, a wearable computer, an e-book reader, a media device, a cellular phone, a laptop computer, or another suitable apparatus. The computing device 102, or functions or constituents thereof, may also be included within an electric vehicle or other device or system. The computing device 102 may include one or more processors 702 configured to execute one or more stored instructions. The processor(s) 702 may comprise one or more cores, and may also be referred to as hardware processors.

The computing device 102 may include one or more I/O interface(s) 704 to allow the processor(s) 702 or other portions of the computing device 102 to communicate with various other computing devices 102, other user devices, the server 112 or other servers, various web-based resources, and so on. The I/O interfaces 704 may be configured to operate in accordance with various protocols such as I2C, SPI, USB, RS-232, and so forth.

The I/O interface(s) 704 may couple to one or more I/O devices 706. The I/O devices 706 may include one or more input devices such as a keyboard, a mouse, a microphone, a digital camera, user input buttons, and so forth. The I/O devices 706 may also include output devices such as one or more displays 708, audio speakers, haptic output devices, and so forth. The I/O devices 706 may also include respective navigation resources 710 such as, without limitation, satellite-based navigation or positioning such as the global positioning system (GPS) or the global navigation satellite system (GLONASS), cellular tower-based locating, inertial navigation devices or systems, radio-based navigation, one or more navigational gyroscopes, and so on. In some embodiments, the I/O devices 706 may be physically incorporated within the computing device 102, or they may be externally placed. The I/O devices 706 may include various other devices, as well.

The computing device 102 may also include one or more communication interfaces 712. The communication interfaces 712 are configured to provide communications with other computing device 102, web-based resources, servers 112, routers, wireless access points 202, network access satellites 204, cellular towers 206, and so forth. The communication interfaces 712 may include wireless functions, devices configured to couple to one or more networks including LANs, Wireless-LANs, WANs, Wireless-WANs, and so forth. The computing device 102 may also include one or more busses or other internal communications hardware or software that allow for the transfer of data between the various modules and components of the computing device 102. The computing device 102 may also include one or more rechargeable batteries 106, as described elsewhere herein. Alternatively, the computing device 102 may draw operating power from a fuel cell, super capacitor, flywheel, or another suitable, replenishable energy source or storage device.

The computing device 102 includes one or more memories 714. The memory 714 comprises one or more computer-readable storage media (CRSM). The memory 714 provides storage of computer readable instructions, data structures, program modules, and other data used during the operation of the computing device 102. The memory 714 may include at least one operating system (OS) module 716. Respective OS modules 716 are configured to manage hardware devices such as the I/O interfaces 704, the I/O devices 706, the communication interfaces 712, and provide various services to applications or modules executing on the processors 702.

Also stored in the memory 714 may be one or more of the following modules. These modules may be executed as foreground applications, background tasks, and so forth. A user interface module 718 may be configured to provide one or more user interfaces 302, and may also provide one or more application programming interfaces. The user interface module 718 may be configured to operate with information encoded as hypertext markup language ("HTML") files, extensible markup language ("XML") files, or in another suitable format or language. The user interface module 718 is configured to accept inputs and send outputs using the I/O interfaces 704, the communication interfaces 712, or both.

The memory 714 may also store one or more application modules 720. Non-limiting examples of the application modules 720 include a word processing application, a spreadsheet application, a technical drawing or illustrating application, a photo editing application, a web browsing application, a portable document viewing application, and so on. The memory 714 may also include the finder module 108 or the management module 518 as respectively described elsewhere herein.

The memory 714 may also include a calendar module 722. The calendar module 722 may include data structure, electronic circuitry, executable program code, and so forth; so as to track various scheduled events, appointments, and the like. For instance, the finder module 108 may access scheduling data, such as air travel flight times or upcoming meetings, within the calendar module 722 for use in determining or recommending rechargeable battery 106 charging times, projecting future energy needs, or for other purposes. The memory 714 may also include one or more other modules 724. Non-limiting examples of the other modules 724 may include cellular communications circuitry, a watchdog or other timer, a wireless internet transceiver, hardware resources for satellite communications or navigation, and so forth.

The memory 714 may also include a datastore 726 to store information. The datastore 726 may use a flat file, database, linked list, tree, executable code, or other data structure to store the information. In some implementations, the datastore 726 or a portion of the datastore 726 may be distributed across one or more other computing devices 102 or other devices including servers 112, network attached storage apparatus, and so forth.

The datastore 726 may store one or more data structures including charging station data 118, or other related information. The datastore 726 may also include historic usage data 506 or one or more power profiles 510 as respectively described elsewhere herein. The historic usage data 506 may include data, statistics, or information regarding usage of the computing device 102 such previous time spans of operation, time-of-day data related to operation, quantities of energy or level differentials drawn from the rechargeable battery(s) 106 during operation, charging times required to recharge the rechargeable battery(s) 106 between respective lesser and greater levels, and so forth. The historic usage data 506 may be accessed and used, and new or amended data may be stored therein, by respective operations of the finder module 108.

For instance, the historic usage data 506 may include average operating time periods, start and stop times-of-day, battery level (i.e., voltage) changes correlated to respective operation periods, and so forth. Other suitable data or information may also be stored in, or read from, the historic usage data 506 such that the finder module 108 may estimate future energy requirements based on the past performance of the computing device 102. In another instance, the finder module 108 tracks rechargeable battery 106 level changes and operating time spans for each usage session, stores this data within the historic usage data 506, such that a growing data set of performance-related information is acquired for present or future use. Other operations or techniques may also be used.

The datastore 726 may also store other data 528. For example, the other data 728 may include one or more data structures that may be queried, modified, amended, and so forth. The other data 728 may also include encryption keys or codes used to access a server or servers 112, or when communicating with network-based resources, and so forth. Accordingly, respective computing devices 102 may be resourced and configured to perform numerous functions, as well as to cooperate with one or more other computing devices 102 or apparatus.

Figure 8:
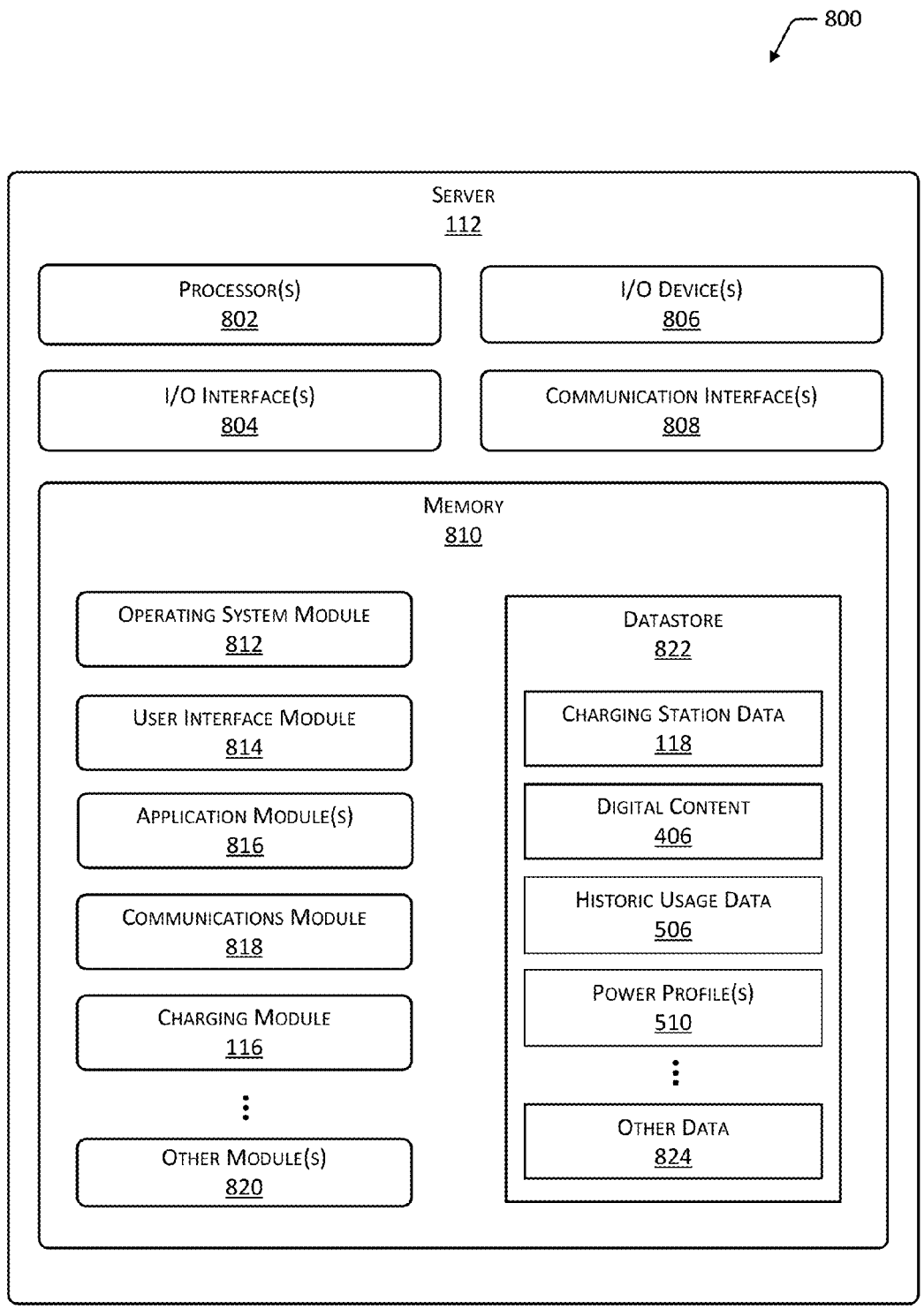
FIG. 8 is a block diagram depicting a server.

FIG. 8 illustrates a block diagram 800 of a server 112. The server 112 is illustrative and non-limiting, and may be defined by a rack-mounted server or another suitable apparatus. The server 112 may include one or more processors 802 configured to execute one or more stored instructions. The processor(s) 802 may comprise one or more cores, and may also be referred to as hardware processors.

The server 112 may include one or more I/O interface(s) 804 to allow the processor(s) 802 or other portions of the server 112 to communicate with various computing devices 102, other servers 112, user devices, web-based resources, and so on. The I/O interfaces 804 may be configured to operate in accordance with various protocols such as I2C, SPI, USB, RS-232, and so forth.

The I/O interface(s) 804 may couple to one or more I/O devices 806. The I/O devices 806 may include one or more input devices such as a keyboard, a mouse, a microphone, a camera, user input buttons, and so forth. The I/O devices 806 may also include output devices such as one or more displays, audio speakers, haptic output devices, and so forth. In some embodiments, the I/O devices 806 may be physically incorporated within the server 112, or they may be externally placed.

The server 112 may also include one or more communication interfaces 808. The communication interfaces 808 are configured to provide communications with other servers 112, various computing devices 102, web-based resources, routers, wireless access points, and so forth. The communication interfaces 808 may include wireless functions, devices configured to couple to one or more networks including LANs, Wireless-LANs, WANs, Wireless-WANs, and so forth. The server 112 may also include one or more busses or other internal communications hardware or software that allow for the transfer of data between the various modules and components of the server 112.

The server 112 includes one or more memories 810. The memory 810 comprises one or more CRSM. The memory 810 provides storage of computer readable instructions, data structures, program modules, and other data for the operation of the server 112. The memory 810 may include at least one operating system (OS) module 812. Respective OS modules 812 are configured to manage hardware devices such as the I/O interfaces 804, the I/O devices 806, the communication interfaces 808, and provide various services to applications or modules executing on the processors 802.

Also stored in the memory 810 may be one or more of the following modules. These modules may be executed as foreground applications, background tasks, and so forth. A user interface module 814 may be configured to provide one or more user interfaces, such as the user interface 302, or aspects or variants thereof, in accordance with signaling or commands from the charging module 116. The user interface module 814 may also provide one or more application programming interfaces. The user interface module 814 may be configured to operate with information encoded as hypertext markup language ("HTML") files, extensible markup language ("XML") files, or in another suitable format or language. The user interface module 814 is configured to accept inputs and send outputs using the I/O interfaces 804, the communication interfaces 808, or both.

The memory 810 may also store one or more application modules 816. Non-limiting examples of the application modules 816 include a word processing application, a data encrypting or decrypting application, a data structure generation or management application, a web browsing application, a portable document generating or viewing application, and so on.

The memory 810 may further store a communications module 818 such that charging station data 118, related information, user interfaces 302, or other data, may be communicated to and from respective computing devices 102. In one example, the communications module 818 includes executable program code, electronic circuitry, or other resources used to transmit and receive wireless signals, signals by way of wired or optical pathways, or in accordance with other techniques. The memory 810 may also store the charging module 116 as described elsewhere herein.

The memory 810 may also include one or more other modules 820. Non-limiting examples of the other modules 820 may include cellular communications circuitry, a watchdog or other timer, a wireless internet receiver, secured data handling or communications resources, and so forth.

The memory 810 may also include a datastore 822 to store information. The datastore 822 may use a flat file, database, linked list, tree, executable code, or other data structure to store the information. In some implementations, the datastore 822 or a portion of the datastore 822 may be distributed across one or more other servers 112 or computing devices, network attached storage apparatus, and so forth.

The datastore 822 may store charging station data 118 as described elsewhere herein. The datastore 822 may also store various types of the digital content 406. The datastore 822 may further store the historic usage data 506 or one or more power profiles 510 as respectively described elsewhere herein. The datastore 822 may further store other data 824. For example, the other data 824 may include one or more data structures that may be queried, modified, amended, and so forth.

Figure 9:
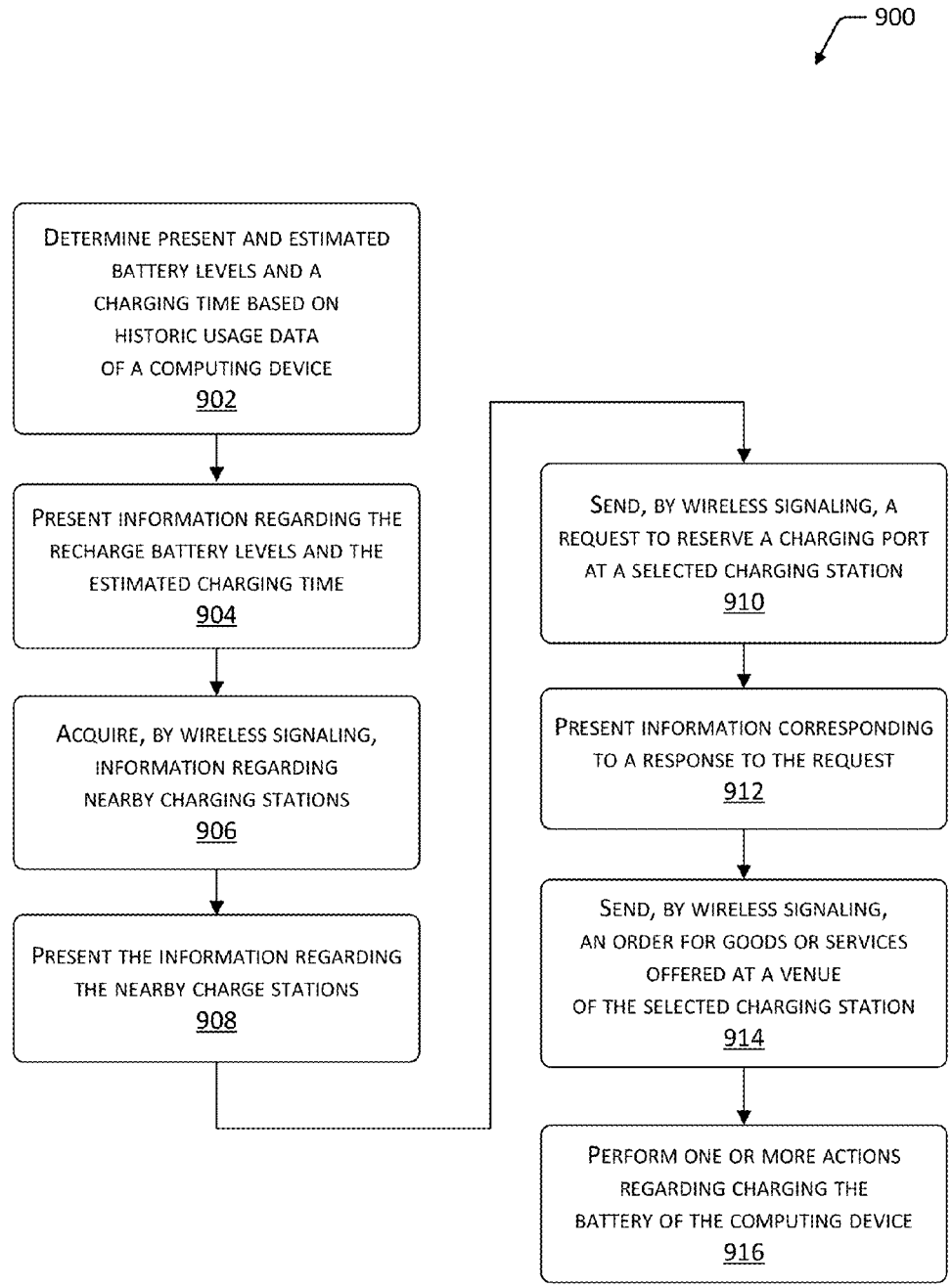
FIG. 9 is a flow diagram of an illustrative process including estimating battery levels and charging time, and providing information about nearby charging stations.

FIG. 9 is a flow diagram 900 illustrating a process including charging a rechargeable battery 106 of a computing device 102 in accordance with an estimated requirement. The process of the flow diagram 900 is illustrative and non-limiting, and other processes including one or more other steps, omitting one or more of the depicted steps, or proceeding in other orders of execution, may also be used.

Block 902 determines present and estimated battery 106 levels and a charging time based on historic usage data 506 of a computing device 102. For purposes of a present example, the user 104 is using the computing device 102, such that electrical energy is being drawn from the rechargeable battery 106. The finder module 108 monitors the present level of the rechargeable battery 106, which for instance is 30%. The finder module 108 also accesses historic usage data 506 and determines that the user 104 will likely want to operate the computing device for another five hours before connecting the computing device 102 to recharge overnight.

The finder module 108 further determines that the rechargeable battery 106 likely requires a level of 65% in order to continue powering the computing device 102 for the estimated five hour time span. Thus, an estimated rechargeable battery 106 level deficiency of 35% exits. Additionally, the finder module 108 estimates that thirty-four minutes of charging time will raise the rechargeable battery 106 from its present 30% level to the estimated 65% need level.

Block 904 presents information regarding the rechargeable battery 106 levels and the estimated charging time. In the present example, the finder module 108 causes a user interface 302 to be presented on a display 708 of the computing device 102. The user interface 302 includes a battery display 306, with a battery graph 308 that graphically and textually depicts the present 30% level and the estimated need 65% level of the rechargeable battery 106. The battery display 306 also includes time estimates 310, depicting the estimated charging time of twenty-three minutes. As such, the user 104 is now aware that the rechargeable battery 106 probably has insufficient stored energy to power the computing device 102 for the remainder of the anticipated usage period.

Block 906 acquires, by wireless signaling 110, information regarding nearby charging stations 122. In the present example, the finder module 108 sends a request to the server 112 seeking information regarding charging stations 122 within accessible venues 120 near to the present location of the computing device 102. The request may include a present geolocation for the computing device 102, information regarding charging port 404 requirements, or other information germane to the charging of the computing device 102. The server 112 responds by accessing the charging station data 118 and selecting charging stations 122 with a prescribed or default distance of the computing device 102, such as three hundred feet. Such a distance may be set or selected by way of the range control 314. Information regarding three particular charging stations 122 is then communicated from the server 112 to the computing device 102, by way of the wireless signals 110.

Block 908 presents the information regarding the nearby charging stations 122. In the present example, the user interface 302 is updated, adding the charging stations display 312, including information regarding three particular charging stations 122 located within respective accessible venues 120. Such information may include distances from the computing device 102 to each of the charging stations 122, numbers of charging ports 404 and their availabilities, additional goods or services that may be offered by the respective venues 120, and so on.

Block 910 sends, by wireless signaling 110, a request to reserve a charging port 404 at a selected charging station 122. In the present example, the user 104 selects the charging station 122 associated with the "coffee shop" venue 120, and actuates a reservation requester 316 device. The finder module 108 responds to this user 104 input and sends a request to a computing entity associated with the "coffee shop", requesting that one of the charging ports 404 be reserved. The request may also include payment information or other data as needed so as to complete or validate the requested transaction.

Block 912 presents information corresponding to a response to the request. In the present example, the computing entity associated with the "coffee shop" validates the request to reserve a charging port 404, and sends a corresponding verification back to the computing device 102 by way of wireless signals 110. The user interface 302 is updated accordingly, and a reservation indicator 318, depicted as a checkmark within a circle, is presented adjacent to the reservation selector 316. The user 104 is now aware that a charging port 404 at the "coffee shop" has been reserved, provided that they arrive within twenty minutes to claim it.

Block 914 sends, by wireless signaling 110, an order for goods or services offered at a venue 120 of the selected charging station 122. In the present example, the user 104 clicks or otherwise actuates a control corresponding to food and beverage orders offered by the "coffee shop" venue 120. A corresponding signal is sent to the computing entity associated with the "coffee shop", and a menu or other information is provided back to the computing device 102. The menu or related information may be presented as a different user interface 302, for instance. The user 104 may then select food items, beverages, or other items and transact an electronic purchase accordingly, before arriving at the "coffee shop". Other similar actions corresponding to an electronic marketplace may also be performed.

Block 916 performs one or more actions regarding charging the battery 106 of the computing device 102. In the present example, the user 104 proceeds to the "coffee shop" venue 120 and locates the charging station 122 there within. The user 104 may communicate with an attendant 418 or other personnel with respect to accessing and using the reserved charging port 404. The computing device 102 is then coupled or suitable mated to the charging port 404, and charging of the rechargeable battery 106 begins. The user 104 may then pickup and enjoy the food or beverage items they ordered in advance, while waiting for the computing device 102 to complete the charging process.

Figure 10:
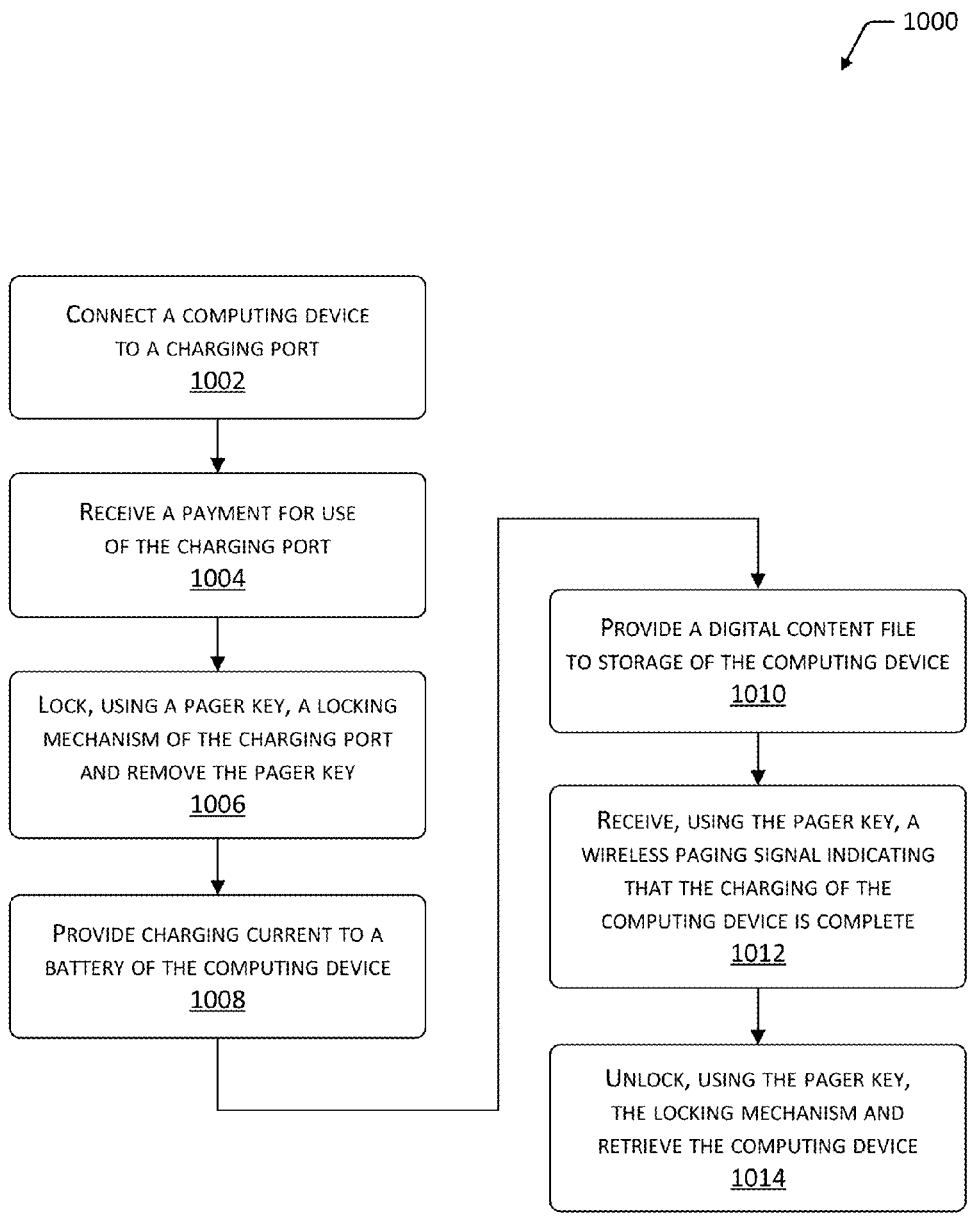
FIG. 10 is a flow diagram of an illustrative process including charging a computing device at a secure charging station.

FIG. 10 is a flow diagram 1000 illustrating a process including charging a rechargeable battery 106 of a computing device 102 using a charging port 404 having a locking mechanism 408. The process of the flow diagram 1000 is illustrative and non-limiting, and other processes including one or more other steps, omitting one or more of the depicted steps, or proceeding in other orders of execution, may also be used.

Block 1002 connects a computing device 102 to a charging port 404. For purposes of a present example, the user 104 approaches the self-service secure charging station 402. The user 104 determines through visual inspection that the charging port 404(3) is available for use. The user 104 connects the computing device to an electrical connector, docking feature, or other aspect of the charging port 404(3). In another instance, the user 104 lays the computing device 102 upon an inductive-type charging pad of the charging port 404(3). Other coupling or connecting schemes may also be used. The result is that the computing device 102 is now in electrical communication with the charging port 404(3).

Block 1004 receives a payment for use of the charging port 404(3). In the present example, the user 104 then communicates with the server 112 by way of a user interface 302 presented by the computing device 102. The user provides credit card information to the server 112, and indicates that twenty-five minutes of charging time are required. The server 112 then communicates a verification of the payment back to the user device 102, as well as verifying that charging port 404(3) is to be used. In another instance, the server 112 may use a computing device 102 identification number, serial number, user 104 club membership code, or other identifier so as to verify an access privilege of the user 104 with respect to the corresponding charging station 122. Such identification information may also facilitate payment by later billing, account charge, or other mechanism, in lieu of payment by credit card at the present time.

Block 1006 locks, using a pager key 410, a locking mechanism 408 of the charging port 404 and removes the pager key 410. In the present example, the user 104 closes a metallic cage or cover over the computing device 102 such that a locking mechanism 408(3) engages. The user 104 then removes a pager key 410 from a connector or the locking mechanism 408(3) of the charging port 404(3). The charging port 404(3) is now in a secured state, such that the computing device 102 is protected against "walk-away" theft by an adverse party. The user 104 may now depart from the SSSCS 402 with confidence that the computing device 102 is locked in place.

Block 1008 provides charging current to a battery 106 of the computing device 102. In the present example, electrical current is communicated through the charging port 404(3) to the computing device 102 such that a rechargeable battery 106 begins to charge from a lesser energy storage level to a greater energy storage level. The server 112 or other control system of the SSSCS 402 is programmed to provide such charging current for twenty-five minutes as purchased by the user 104.

Block 1010 downloads a digital content 406 file to storage 714 of the computing device 102. In the present example, the server 112 communicates advertising regarding services or items available from the SSSCS 402, or other charging stations 402 or 412 operated as part of a commercial enterprise, to the computing device 102. Such advertising is provided as digital content 406 that is stored within non-transitory storage media 714 of the computing device 102. The advertising may be configured to present information on the display 708 of the computing device based on present geographic location, in accordance with a present level of the rechargeable battery 106, and so forth.

Block 1012 receives, using the pager key 410, a wireless paging signal indicating that a charging of the computing device 102 is complete. In the present example, the pager key 410 receives a wireless signal 110 indicating that the twenty-five minute charging process of the computing device 102 is complete. The pager key 410 then provides an audible or visible indication, or both, to that effect. The user 104 is now aware that charging of the rechargeable battery 106 of the computing device 102 is done.

Block 1014 unlocks, using the pager key 410, the locking mechanism 408(3) and retrieves the computing device 102. In the present example, the user 104 returns to the location of the SSSCS 402 and returns the pager key 410 to its connector or receiving point on the locking mechanism 408(3) of the charging port 404(3). In response, the locking mechanism 408(3) unlocks and the metallic cage or cover may be opened, such that the computing device 102 may be removed. The user 104 retrieves the computing device 102, and departs from the SSSCS 402.

Figure 11:
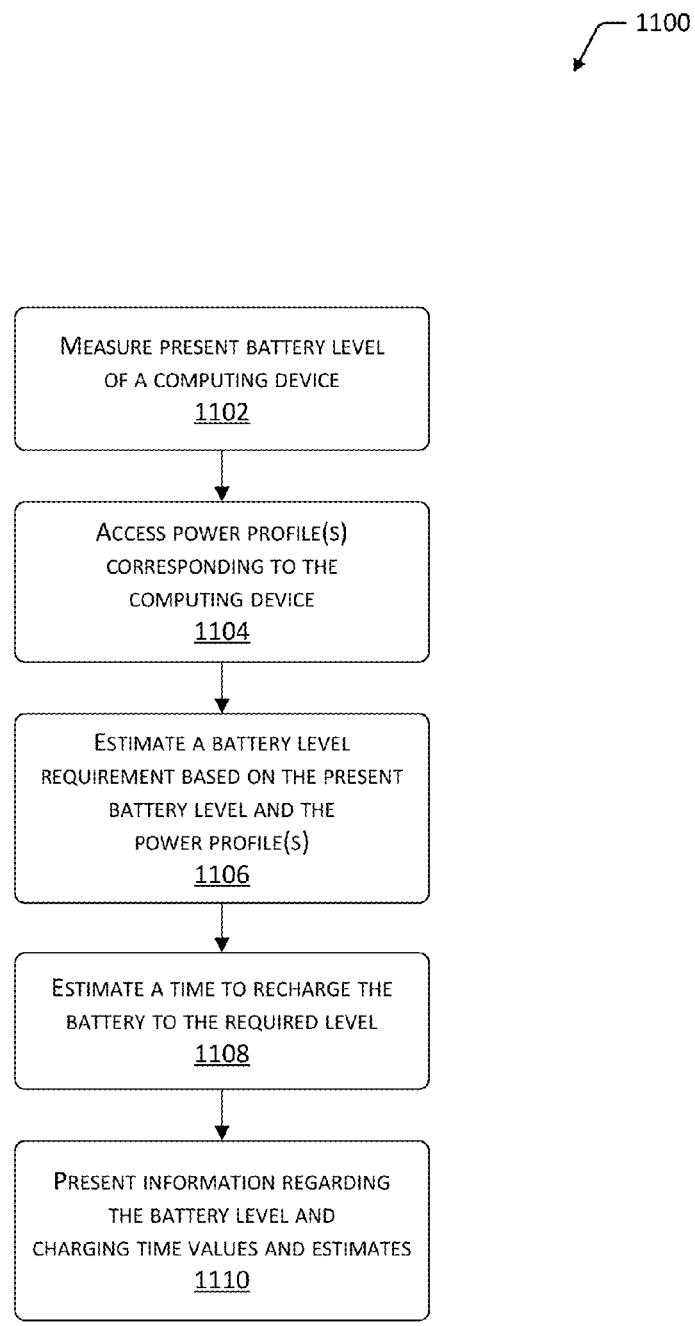
FIG. 11 is a flow diagram of an illustrative process including determining and estimating respective battery levels, estimating a charging time, and presenting that information regarding those values.

FIG. 11 is a flow diagram 1100 illustrating a process including presenting information regarding a battery charge level and an estimated charging time. The process of the flow diagram 1100 is illustrative and non-limiting, and other processes including one or more other steps, omitting one or more of the depicted steps, or proceeding in other orders of execution, may also be used.

Block 1102 measures a present battery 106 level within a computing device 102. For purposes of a present example, the finder module 108 measures a present level of 22% for the rechargeable battery 106, which provides operating energy to the computing device 102. In one instance, the finder module 108 uses electronic circuitry or other resources to measure the rechargeable battery 106 level. In another instance, the finder module 108 receives information or data corresponding to the rechargeable battery 106 level from power management resources or other aspects of the computing device 102.

Block 1104 accesses one or more power profiles 510 corresponding to the computing device 102. In the present example, the finder module 108 accesses power profiles 510 within the computing device 102 corresponding to two respective operations that the user 104 is expected to perform. For instance, power profiles 510 describing power consumption for two hours of movie viewing and forty-five minutes of handling e-mail messages are selected. The finder module 108 further determines that 4 hours of operation have already elapsed for the present day, with an estimated remaining operating period of 2.75 hours.

Block 1106 estimates a battery level requirement based on the present battery level and the power profiles 510. In the present example, the finder module 108 uses the power profiles 510 to further estimate that a rechargeable battery 106 level of 65% is likely required to provide sufficient power the remaining operating hours expectation of 2.75 hours. Thus, an estimated battery 106 level shortfall exists of (65%–22%)=43%. That is, the finder module 108 estimates that the rechargeable battery 106 must be charged so as to add 43% to the present level of 22%.

Block 1108 estimates a time to recharge the battery 106 to the needed battery level. In the present example, the finder module 108 uses the power profiles 510 once again to estimate that a charging time of thirty-seven minutes is likely required to add the estimated 43% of level to the rechargeable battery 106.

Block 1110 presents information regarding the battery level and charging time values and estimates. In the present example, the finder module 108 causes a user interface 302 to appear on the display 708 of the computing device 102. The user interface 302 may include a battery display 306, including a battery graph 308 or other indicia of the present battery level of 22%, and the estimated required battery level of 65%. The user interface 302 may also include time estimates 310, indicative of the thirty-seven minutes of charging time estimated to raise the recharge battery 106 to the 65% level. The user 104 is now aware of the need to recharge the computing device 102 in order to continue operating through the remainder of the estimated workday.

Figure 12:
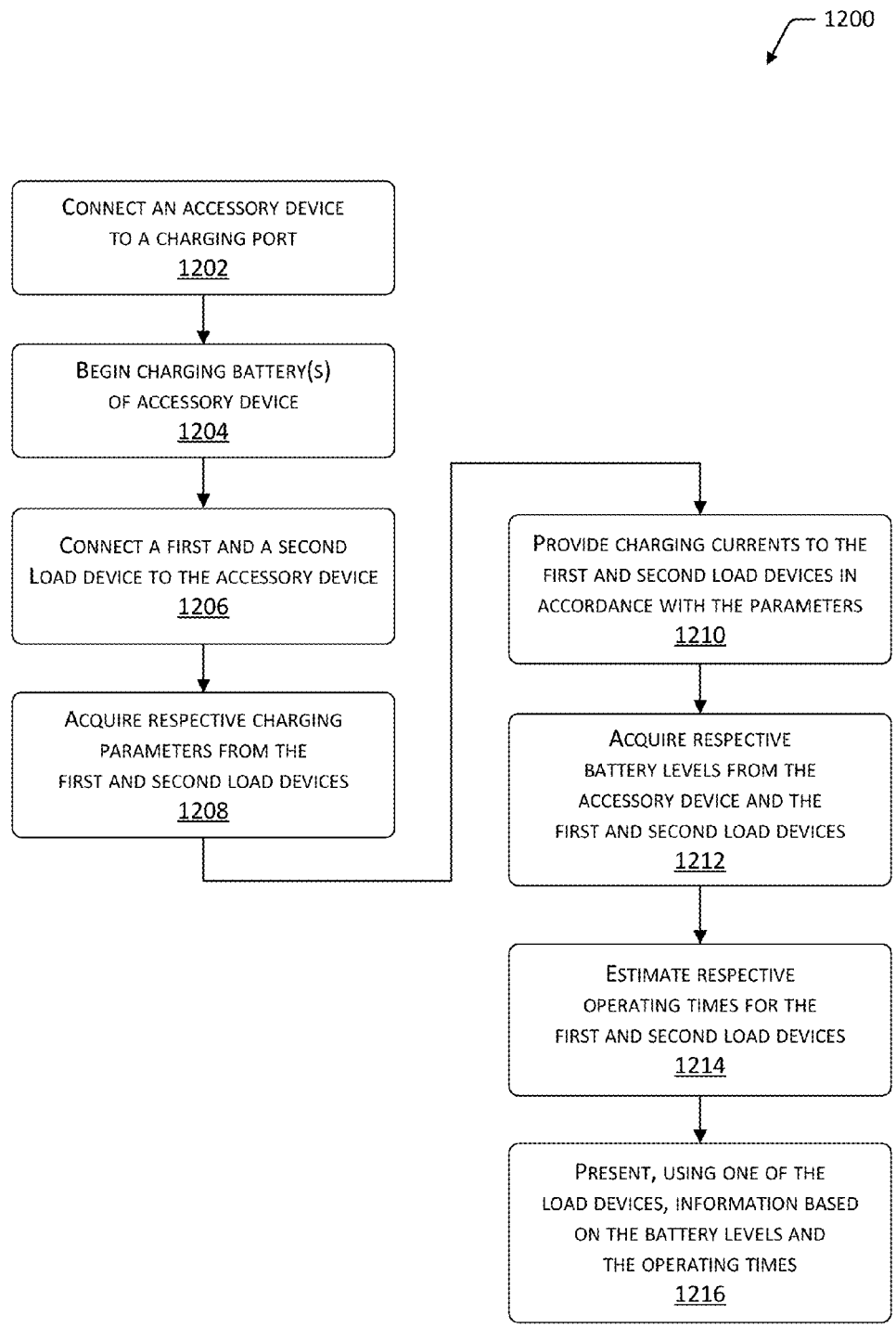
FIG. 12 is a flow diagram of an illustrative process including charging an accessory device, and charging respective load devices using the accessory device.

FIG. 12 is a flow diagram 1200 illustrating a process including charging two different load devices using an accessory device. The process of the flow diagram 1200 is illustrative and non-limiting, and other processes including one or more other steps, omitting one or more of the depicted steps, or proceeding in other orders of execution, may also be used.

Block 1202 connects an accessory device 502 to a charging port 404. For purposes of a present example, the user 104 couples the accessory device 502 to a charging port 404. The connection may be made using a USB-protocol cable and connector, or by way of another suitable cabling or connection arrangement. The accessory device 502 is now in electrical communication with the charging port 404.

Block 1204 begins charging the battery or batteries 106 of the accessory device 502. In the present example, charging power 512 is provided from the charging port 404 to the accessory device 502. In turn, the operating module 504 functions to regulate or control the charging of the battery(s) 106 using the charging power 512.

Block 1206 connects a first and a second load device 508 to the accessory device 502. In the present example, the user 104 connects the computing device 102 and the smart phone 422 to the accessory device 502, wherein the computing device 102 and the smart phone 422 define first and second load devices 508, respectively. USB or other cabling or connector types may be used to make the respective connections. Thus, the computing device 102 and the smart phone 422 are connected in electrical communication with the accessory device 502.

Block 1208 acquires respective charging parameters from the first and second load devices 508. In the present example, the accessory device 502 receives charging parameter information, such as voltage and current values, from the management module 518 of the computing device 102, by way of the power and data 514 signaling. The smart phone 422 communicates charging parameters to the management module 518 by way of the wireless signals 110, and the computing device 102 then relays these parameters to the accessory device 502 by way of the power and data 514 signaling. The operating module 504 receives these respective charging parameters, accordingly. The wireless signals 110 may be in accordance with Wi-Fi™, Bluetooth®, or another suitable protocol.

Block 1210 provides charging currents to the first and second load devices 508 in accordance with the parameters. In the present example, the accessory device 502 provides electrical energy to the computing device 102 by way of the power and data 514 signaling, and the battery 106 of the computing device 102 begins to charge. In turn, the accessory device 502 provides electrical energy to the smart phone 422 by way of the power 516 signaling, and a battery 106 or energy storage device of the smart phone 422 begins to charge, accordingly. The operating module 504 may control voltage or current characteristics, or both, of the two respective electrical energy feeds to the computing device 102 and the smart phone 422. Alternatively, resources of the computing device 102 or the smart phone 422, respectively, may regulate or limit such charging actions.

Block 1212 acquires respective battery 106 levels from the accessory device 502 and the first and second load devices 508. In the present example, the management module 518 queries the accessory device 502 for a present level value of its battery 106, using the power and data 514 signaling. The computing device 102 also queries the smart phone 422 for a present battery 106 level value, using the wireless signals 110. The accessory device 502 and the smart phone 422 communicate their respective battery 106 levels to the management module 518. The management module 518 also acquires a present level of the battery 106 of the computing device 102 from circuitry or resources internal thereto.

Block 1214 estimates respective operating times for the first and second load devices 508. In the present example, the management module 518 estimates operating or "run" times for the computing device 102 and the smart phone 422, respectively, based on the respective battery 106 levels of these load devices 508 and the accessory device 502. Specifically, the management module 518 historic usage data 506 or one or more power profiles 510, or both, to estimate or predict energy consumption quantities for the computing device 102 and the smart phone 422, respectively.

Such energy consumption estimates may then be used, along with the respective present battery 106 levels, to estimate operating times for the computing device 102. Such estimates may be in terms of minutes, hours and minutes, seconds, or other suitable units. The result is that the management module 518 estimates how long the computing device 102 and the smart phone 422, respectively, may be used by way of energy stored within their internal batteries 106, and by way of the energy stored within the accessory device 502. Estimated total operating times for the computing device 102 and the smart phone 422 may also be determined, wherein a particular total operating time is based on stored energy of the particular load device 508 plus stored energy of the accessory device 502. Thus, an estimated total operating time is based, in part, on energy that may be transferred from the accessory device 502 to a particular load device 508.

Block 1216 presents, using one of the load devices 508, information based on the battery 106 levels and the operating times. In the present example, the management module 518 of the computing device 102 presents displayed data 124 using a display 708. The displayed data 124 may include the battery 106 levels of the accessory device 502, the computing device 102, or the smart phone 422, or any combination of or all of these. The displayed data 124 may also include the respective estimated operating times, which may be presented in minutes, hours and minutes, and so on. Other varying or related information may also be presented. In this way, the user 104 is apprised of the likely operating times for the computing device 102 and the smart phone 422, respectively, prior to or during business travel, at the onset of a workday or other meaningful time period, and so forth. Task management, anticipation of recharging periods, and other planning may be performed by the user 104 in view of the information provided by the displayed data 124.

As described above, estimates regarding levels of rechargeable battery or other energy storage devices within computing devices or other equipment may be determined and presented to a user. Estimated charging times for such batteries or energy storage devices may also be presented. Stored information, or information available through a wireless network, may be accessed and used to identify or locate charging stations provided within accessible venues, which may be open to the public or to the particular user, that are near to the present location of the computing device. A user may then select a suitable venue for recharging the battery or batteries within their computing device based on the presented information. Additionally, a reservation for such a charging station may be made, or items or services may be ordered in advance of arriving at a corresponding, selected venue.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computing device, configured to:
   determine, using electronic circuitry of the computing device, a present level of energy stored by a rechargeable battery, wherein the rechargeable battery is configured to provide operating power to the computing device;
   estimate, using a processor of the computing device and based on historical usage data stored within a memory, a greater stored energy level of the rechargeable battery to operate the computing device for a period of time;
   estimate, using the processor of the computing device and based on the present stored energy level of the rechargeable battery, a time to charge the rechargeable battery to the greater stored energy level;
   provide a request to a server to access charging station information indicative of locations of one or more charging stations, wherein at least a subset of the locations correspond to one or more venues accessible to a user of the computing device;
   receive at least a portion of the charging station information from the server;
   present, using a display associated with the computing device, the locations of at least a subset of the one or more charging stations, the present stored energy level of the rechargeable battery, the greater stored energy level of the rechargeable battery, and the time to charge the rechargeable battery to the greater stored energy level.

2. The computing device of claim 1, further configured to:
   send, using a communications interface of the computing device, a request to reserve a charging port at a charging station of the one or more charging stations;
   receive a response to the request, the response including an acceptance of the request; and
   present, using the display associated with the computing device, the response, wherein the presentation is indicative of the acceptance of the request.

3. The computing device of claim 1, further configured to discontinue operation of one or more communication nodes of the computing device while the computing device is electrically connected to a charging port of the one or more charging ports.

4. The computing device of claim 1, further configured to:
   receive user input indicative of a selection of a charging station of the one or more charging stations; and
   present output associated with one or more of:
      a map associated with a location of the charging station;
      navigational aid associated with the location of the charging station;
      reservation information associated with the charging station; or
      one or more items or services offered by an entity associated with the charging station.

5. The computing device of claim 1, further configured to:
   access calendar data associated with the computing device, the calendar data indicating a time that a user of the computing device is available to charge the computing device;
   wherein the request to access the charging station information is provided based at least in part on correspondence between the time that the user of the computing device is available and the time to charge the rechargeable battery to the greater stored energy level.

6. A method performed at least in part by a hardware processor, the method comprising:
   providing, to a first device, a request to access information regarding a charging station within a distance of a computing device, the computing device including an energy storage device, wherein the charging station is separate from the first device;
   receiving at least a portion of the information regarding the charging station from the first device;
   estimating a time to charge the energy storage device from a present energy level to a greater energy level, wherein the greater energy level corresponds to an estimated energy consumption of the computing device; and
   presenting, by way of a presentation device associated with the computing device, the present energy level, the time to charge the energy storage device, and the at least a portion of the information regarding the charging station.

7. The method of claim 6, further comprising:
   estimating a future power consumption from the energy storage device corresponding to a time period; and determining, based on the present energy level and the estimated future power consumption, the greater energy level.

8. The method of claim 6, further comprising:
accessing calendar data stored within the computing device, wherein the calendar data indicates one or more of: a time that a user of the computing device is available to charge the computing device; or a time that the user of the computing device is not available to charge the computing device; and
providing the calendar data to the first device;
wherein the request to access the information regarding the charging station is provided based at least in part on correspondence between the calendar data and the time to charge the energy storage device from the present energy level to the greater energy level.

9. The method of claim 6, further comprising:
receiving, from an entity associated with the charging station, an indication of one or more of an item or a service offered by the entity; and
sending, from the computing device to the entity, an order regarding the one or more of the item or the service.

10. The method of claim 6, further comprising:
presenting information regarding at least two charging stations;
receiving user input selecting the charging station; and
sending, from the computing device to an entity associated with the charging station, a request to reserve a port for use by the computing device.

11. The method of claim 6, further comprising:
coupling the computing device to a port of the charging station, wherein the port is configured to provide a fuel cell reactant to the energy storage device; and
securing, using a locking mechanism, the computing device to the charging station.

12. The method of claim 11, wherein the locking mechanism is operated using an electronic pager device configured to indicate, as received by way of wireless signals, a charging status of the energy storage device of the computing device.

13. The method of claim 6, further comprising:
connecting the computing device to a port of the charging station;
providing, using the port, electrical energy to the energy storage device; and
providing, using the port, digital content to the computing device, wherein the digital content includes one or more of an audio file, a video file, an e-book, an advertisement, an application, an operating system, or an upgrade.

14. The method of claim 6, wherein the information includes at least one of:
a map associated with a location of the charging station;
a distance from the computing device to the charging station;
navigational aid associated with the location of the charging station; or
reservation information associated with the charging station.

15. The method of claim 6, further comprising sending, from the computing device to an entity associated with the charging station, a request to reserve a charged battery in accordance with a battery exchange program.

16. One or more non-transitory computer readable storage media including program code, the program code configured to cause one or more processors to:
retrieve information stored within a non-transitory storage medium, information including one or more of a user-established setting or a data file of a first computing device;
provide the information to a memory of a second computing device;
determine a present level of an energy storage device of the second computing device;
estimate, using one or more of historical usage data or a power profile, an estimated level for the energy storage device, the estimated level corresponding to a future energy requirement for the second computing device;
access charging station information from one or more of the first computing device, the second computing device, or a third computing device in communication with the second computing device, the charging station information indicating one or more charging stations accessible to the energy storage device, wherein the one or more charging stations are separate from the one or more of the first computing device, the second computing device, or the third computing device; and
present, using an output device, at least a subset of the charging station information and information regarding one or more of the present level or the estimated level.

17. The one or more non-transitory computer readable storage media of claim 16, the program code further configured to cause the one or more processors to send a message to an entity associated with a charging station of the one or more charging stations, wherein the message includes at least one of a request to reserve a charging port, an order for an item, or an order for a service.

18. The one or more non-transitory computer readable storage media of claim 17, the program code further configured to cause the one or more processors to send status information regarding a charging of the energy storage device to a remote computing device by way of wireless signals, wherein the second computing device stores contact information for the remote computing device, and wherein the remote computing device is configured to provide an indication corresponding to the status information.

19. The one or more non-transitory computer readable storage media of claim 16, the program code further configured to cause the one or more processors to send an alert to a remote computing device, wherein the alert indicates that one or more of the first computing device or the second computing device has been reported stolen.

20. The one or more non-transitory computer readable storage media of claim 16, wherein the data file includes calendar data indicating a time that a user of the energy storage device is available to charge the energy storage device, the program code further configured to cause the one or more processors to:
determine a time to charge the energy storage device to the estimated level; and
present the at least a subset of the charging station information calendar data based on correspondence between the time that the user of the energy storage device is available and the time to charge the energy storage device to the estimated level.

* * * * *

UNITED STATES PATENT AND TRADEMARK OFFICE
CERTIFICATE OF CORRECTION

| | | |
|---|---|---|
| PATENT NO. | : 9,442,548 B1 | |
| APPLICATION NO. | : 14/218938 | |
| DATED | : September 13, 2016 | |
| INVENTOR(S) | : Jesper Mikael Johansson et al. | |

It is certified that error appears in the above-identified patent and that said Letters Patent is hereby corrected as shown below:

Title Page of Patent: column 2, line 7, (56) References Cited, U.S. Patent Documents, 2013/0311803 A1* 1/2013 Abendroth ... G06F 1/3212 713/320

Correction: 2013/0311803 A1* 11/2013 Wang ... G06F 1/3212 713/320

Signed and Sealed this
Fifteenth Day of November, 2016

Michelle K. Lee
*Director of the United States Patent and Trademark Office*